United States Patent
Saito

(10) Patent No.: US 12,538,007 B2
(45) Date of Patent: Jan. 27, 2026

(54) LENS DEVICE, WITH OPTICAL DEVICE, IMAGING DEVICE, IMAGING SYSTEM, AND MOVABLE APPARATUS INCORPORATING SAME

(71) Applicant: CANON KABUSHIKI KAISHA, Tokyo (JP)

(72) Inventor: Kento Saito, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 18/498,913

(22) Filed: Oct. 31, 2023

(65) Prior Publication Data

US 2024/0147043 A1 May 2, 2024

(30) Foreign Application Priority Data

Nov. 1, 2022 (JP) .................... 2022-175527

(51) Int. Cl.
*H04N 23/55* (2023.01)
*G02B 7/02* (2021.01)
*G02B 13/00* (2006.01)

(52) U.S. Cl.
CPC ............. *H04N 23/55* (2023.01); *G02B 7/021* (2013.01); *G02B 13/005* (2013.01)

(58) Field of Classification Search
CPC ...... H04N 23/55; G02B 7/021; G02B 13/005; G02B 13/0015
USPC ........................................................ 348/335
See application file for complete search history.

(56) References Cited

U.S. PATENT DOCUMENTS

| | | | |
|---|---|---|---|
| 2004/0109243 A1* | 6/2004 | Orimo | H04N 17/002 359/819 |
| 2004/0130803 A1* | 7/2004 | Iwasaki | G02B 7/023 359/700 |
| 2006/0056060 A1* | 3/2006 | Ozaki | G02B 13/001 359/704 |
| 2007/0064141 A1* | 3/2007 | Misawa | H04N 23/54 348/E5.045 |
| 2007/0273982 A1* | 11/2007 | Ishizuka | G02B 7/102 359/700 |
| 2014/0268180 A1* | 9/2014 | Takaura | G03G 15/5054 356/624 |
| 2019/0204533 A1* | 7/2019 | Kaneko | G02B 7/04 |

FOREIGN PATENT DOCUMENTS

JP 5049220 B2 10/2012

* cited by examiner

*Primary Examiner* — Usman A Khan
(74) *Attorney, Agent, or Firm* — Canon U.S.A., Inc., IP Division

(57) ABSTRACT

A lens device includes a lens barrel, a retaining member, a biased portion, and an elastic member. The lens barrel accommodates a plurality of lenses. The retaining member is in contact with at least one of the plurality of lenses. The biased portion is fixed to the retaining member. The elastic member is disposed between the biased portion and the lens barrel in an optical axis direction. The biased portion is disposed inner side of the retaining member and outer side of the lens barrel in a radial direction, and is biased by the lens barrel via the elastic member in the optical axis direction.

12 Claims, 11 Drawing Sheets

LENS DEVICE, WITH OPTICAL DEVICE, IMAGING DEVICE, IMAGING SYSTEM, AND MOVABLE APPARATUS INCORPORATING SAME

BACKGROUND

Field of the Disclosure

The disclosure relates to a lens device, an optical device, an imaging device, an imaging system, a movable apparatus, and the like.

Description of the Related Art

For example, optical devices installed in automobiles include cameras that perform sensing for performing a driving assistance function and an automatic driving function and image the surroundings of the automobiles. In addition, a LiDAR (light detection and ranging) is used as an optical device having a sensing function.

This equipment includes a lens barrel that holds lenses as optical elements. When a lens is held in a lens barrel, a change in the environmental temperature due to a difference in the amount of expansion and contraction caused by a difference in linear expansion coefficient between the lens and the lens barrel results in a possibility that a gap (looseness) or tightening will occur in an optical axis direction.

Changes in a holding position due to the looseness and surface deformation of the lens due to the tightening may cause deterioration of optical performance and deterioration of parts over time. In-vehicle cameras and LiDAR are required to guarantee excellent performance and functions in all temperature ranges in a temperature environment that changes over a wide range.

Further, in-vehicle cameras usually do not include an autofocus mechanism for reasons of cost and reliability that does not lead to failures. Automobiles are required to have higher driving assistance and autonomous driving functions than those being currently used, and optical systems of in-vehicle cameras, which are eyes of vehicles, are required to be more complicated and highly functional.

As an optical system of an in-vehicle camera becomes more complicated and functionalized, the number of optical elements also increases, and a pressing ring and looseness and tightening between a lens barrel and a lens caused by changes in temperature may become larger. On the other hand, there is a configuration in which an elastic member is sandwiched and held between the pressing ring and the lens and is crushed a required amount in advance at the time of assembling at a normal temperature to provide an elastic force and eliminate looseness at high temperatures.

In-vehicle cameras are used to monitor the front, surroundings, and rear of vehicles, and these are generally desired to have a wide angle of view in order to obtain a large amount of information with one camera for space saving. Japanese Patent No. 5049220 has a configuration in which a plate spring is provided on a pressing ring that holds a lens so that the pressure of the plate spring does not cause looseness in an optical axis direction accompanying changes in temperature.

However, in Japanese Patent No. 5049220, a length in the radial direction is required to impart an elastic force to the plate spring. Further, even when the elastic member is held between the pressing ring and the lens, it is necessary to dispose the elastic member at a position radially away from an effective diameter of the lens in order to secure a wide viewing angle. In other words, there is a possibility that the pressing ring will become larger in the radial direction.

The camera with a wide angle of view tends to have a large radial size of the lens closest to a subject. In addition, when the pressing ring also needs to be long in the radial direction, there is a possibility that the diameter of a lens barrel unit (lens device) including the pressing ring will increase.

Due to an increase in the diameter of the lens barrel unit on the object side, when the installation height of the camera is specified at the time of installing the camera close to a windshield that is inclined from the front to the rear of a vehicle body, the entire camera is disposed at the rear, which results in a possibility that an installation space will increase.

When there is a gap between the windshield and the lens, light from below the camera may be reflected by the windshield and incident on the lens. When the light reflected by the windshield is incident on the lens, an image generated by the light may be reflected in an image captured by the camera. In order to prevent this reflection, for example, an anti-reflection hood is provided to extend from below the camera toward the windshield.

Because of the entire camera being installed at the rear due to an increase in the diameter of the lens barrel unit on the object side, it is necessary to further extend the anti-reflection hood toward the windshield, which may result in a possibility that the size of the entire camera unit will be increased.

SUMMARY OF THE DISCLOSURE

According to an aspect of the present disclosure, a lens device includes a lens barrel configured to accommodate a plurality of lenses, a retaining member configured to be in contact with at least one of the plurality of lenses, a biased portion fixed to the retaining member, and an elastic member disposed between the biased portion and the lens barrel in an optical axis direction, wherein the biased portion is disposed inner side of the retaining member and outer side of the lens barrel in a radial direction, and wherein the biased portion is biased by the lens barrel via the elastic member in the optical axis direction.

Further features of the present disclosure will become apparent from the following description of embodiments with reference to the attached drawings.

DESCRIPTION OF THE EMBODIMENTS

Hereinafter, with reference to the accompanying drawings, favorable modes of the present disclosure will be described using embodiments. In each diagram, the same reference signs are applied to the same members or elements, and duplicate description will be omitted or simplified.

First Embodiment

Figure 1:
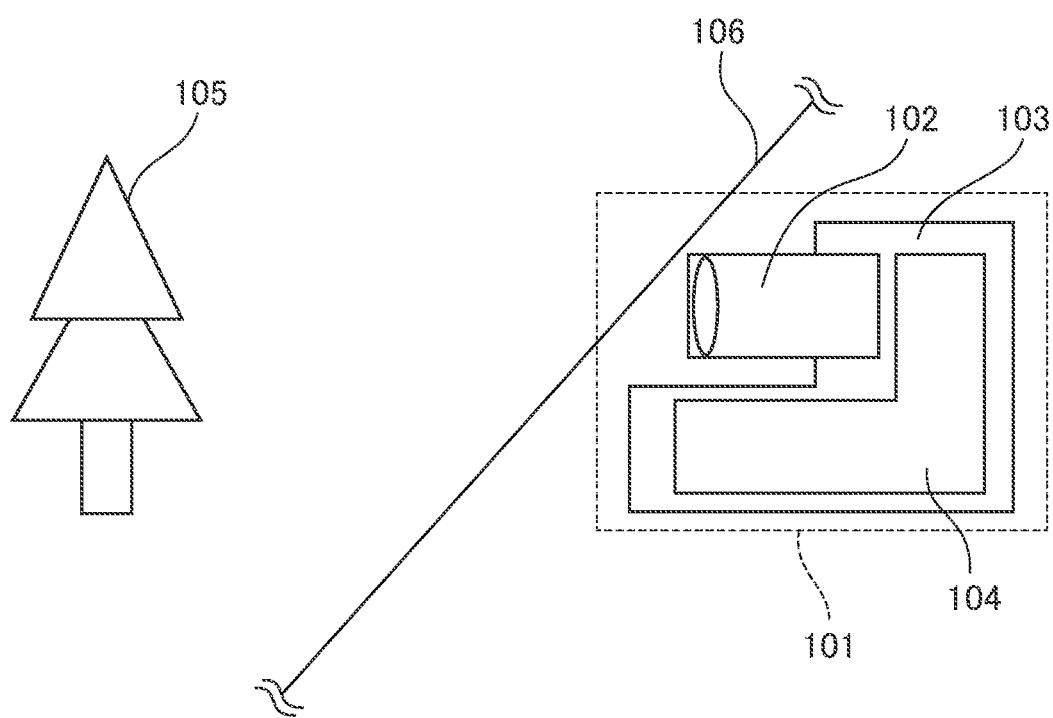
FIG. 1 is a schematic diagram of an optical device 101 in a first embodiment.

FIG. 1 is a schematic diagram of an optical device 101 according a first embodiment. The optical device 101 includes a lens barrel unit (lens device) 102, a housing 103 that holds the lens barrel unit 102, an electric device 104, and the like.

For example, when the optical device 101 is an in-vehicle camera, the lens barrel unit 102 functions as an imaging optical system. When the optical device 101 images a subject 105, a signal is input to the electric device 104 including an image sensor, and thus environment information on the surroundings of an automobile is acquired.

The image sensor is, for example, a CCD or CMOS image sensor, and converts an image formed by condensing through the lens barrel unit 102 into an electrical signal. The converted electric signal is converted into digital image data or the like and is used in a system for driving assistance and automatic driving.

Regarding the lens barrel unit 102 of the optical device 101 such as an in-vehicle camera, a part of the lens barrel unit 102 as a lens device is exposed from the housing, and the lens barrel unit 102 may be installed on the vehicle body with a lens directed toward a subject from the housing 103 to be close to the windshield 106. When there is a gap between the windshield 106 and the lens barrel unit 102, light from below the optical device 101 may be reflected by the windshield 106 and incident on the lens barrel unit 102.

When the light reflected by the windshield 106 is incident on the lens, an image formed by the light is reflected on an image sensor through the lens barrel unit 102. In order to prevent this reflection, an anti-reflection hood, which is not illustrated in the drawing, is provided to extend from below the optical device 101 toward the windshield 106.

Figure 2:
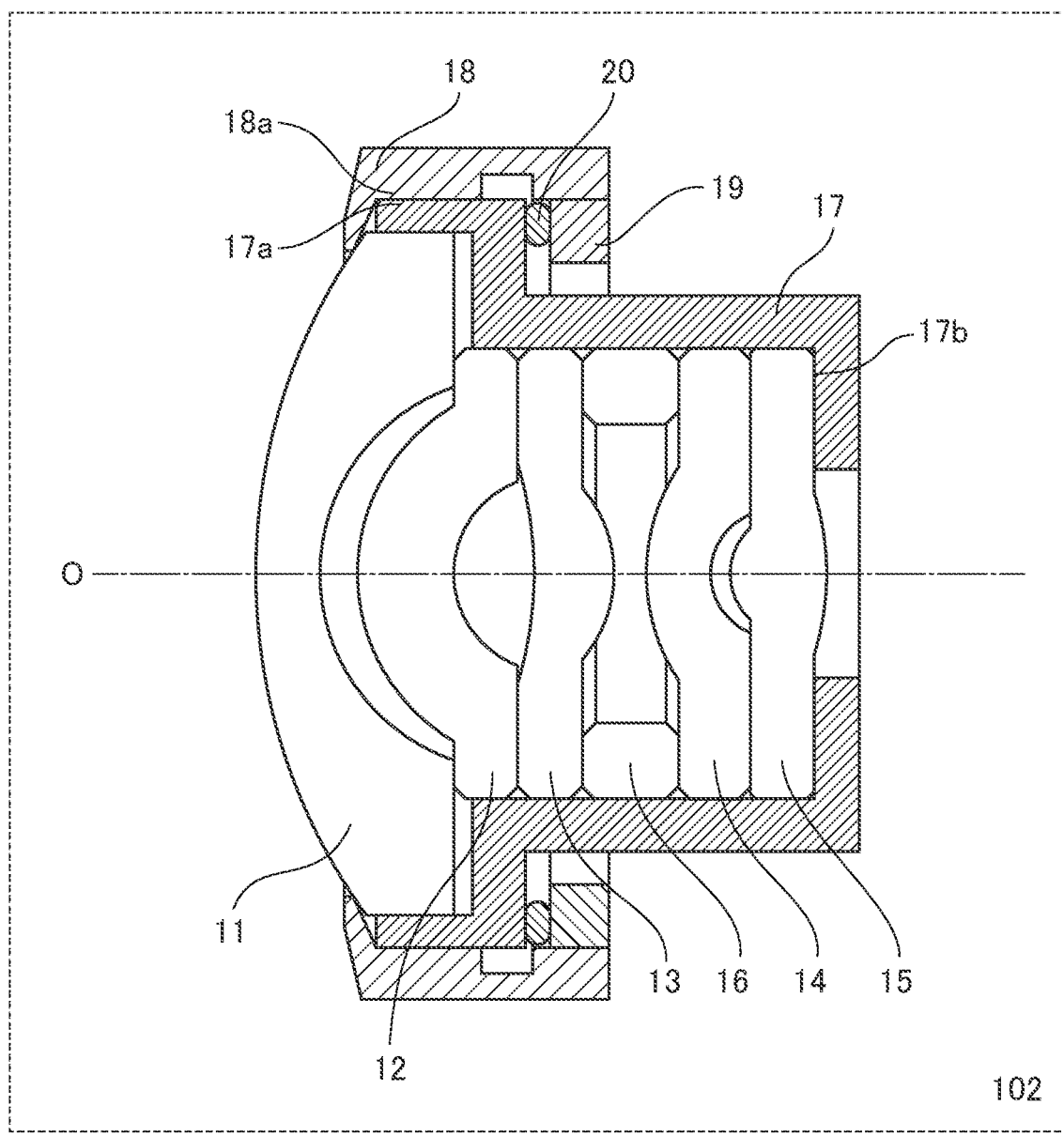
FIG. 2 is a cross-sectional view illustrating a structural example of a lens barrel unit 102 according to the first embodiment.

FIG. 2 is a cross-sectional view illustrating a structural example of the lens barrel unit 102 according to the first embodiment. The lens barrel unit 102 includes a lens barrel 17 that accommodates a plurality of lenses including, for example, a first lens 11, a second lens 12, a third lens 13, a fourth lens 14, and a fifth lens 15 from an object side (a subject side, left side in FIG. 2). In addition, the lens barrel 17 includes a spacer 16 disposed between the third lens 13 and the fourth lens 14.

Further, the lens barrel 17 includes a retaining member 18 and an elastic member 20 that come into contact with the first lens 11 on the object side and hold the first lens 11 in the lens barrel 17. That is, the retaining member 18 comes into contact with at least one of the plurality of lenses.

The first lens 11, the second lens 12, the third lens 13, the fourth lens 14, and the fifth lens 15 in the first embodiment are, for example, glass lenses. It is assumed that the spacer 16, the lens barrel 17, and the retaining member 18 are made of a metal material.

The number of lenses, the number of spacers, the materials of the lenses, the spacers, the lens barrel, and the like can be arbitrarily set in accordance with the applications thereof and the like. For example, the first lens 11 may be a spherical glass lens, and the second lens 12, the third lens 13, the fourth lens 14, and the fifth lens 15 may be resin lenses. The retaining member 18 may be made of a resin material.

Such a lens barrel unit 102 may be provided with an "aperture diaphragm" that limits the amount of transmitted light and determines an F-number, which is an index of brightness, or a "light shielding diaphragm" that shields light rays causing ghosts and light rays causing aberrations.

However, they are omitted in the first embodiment. The surfaces of the first lens 11, the second lens 12, the third lens 13, the fourth lens 14, and the fifth lens 15 are provided with an antireflection film, a hydrophilic film, a water-repellent film, or the like, as necessary.

The elastic member 20 is constituted by a spring made of a rubber material such as silicone rubber taking heat resistance into consideration or a metal material such as a compression coil spring or a wave washer so that its physical properties are not affected even in a harsh in-vehicle temperature environment. The elastic member 20 is sandwiched and held in the direction of an optical axis O between the lens barrel 17 and the biased portion 19 provided in and the retaining member 18.

Here, a method of assembling the lens barrel unit 102 is described. The lens barrel unit 102 accommodates and holds the first lens 11, the second lens 12, the third lens 13, the fourth lens 14, the fifth lens 15, and the spacer 16 inside the lens barrel 17. Next, in this state, the elastic member 20 and the retaining member 18 provided with the biased portion 19 are inserted from a side opposite to the object side, and a lens barrel fitting portion 17a and a retaining member fitting portion 18a are fitted together, for example, by crimping or the like.

That is, in a state where the elastic member 20 is compressed, the first lens 11 is fixed to the lens barrel 17 in the direction of the optical axis O, for example, by roller crimping or thermal crimping of an object side tip portion of the retaining member 18. By holding the first lens 11 by the retaining member 18 while the elastic member 20 is compressed by a required amount, the first lens 11 is constantly pressed by the retaining member 18 due to a reaction force of an elastic force of the elastic member 20.

The optical system having a wide viewing angle has a feature that the first lens 11 closest to the subject, among the plurality of lenses, has a larger outer diameter than the other lenses. The retaining member 18 can press the first lens 11 without increasing the outermost diameter of the lens barrel unit 102 including the retaining member 18 by disposing the elastic member 20 on an image plane side of the first lens 11 (the side opposite to the object side) through the lens barrel 17.

Further, even when the elastic member 20 is twisted or compressed in a direction orthogonal to the direction of the optical axis O at the time of assembling, the lens barrel fitting portion 17a and the retaining member fitting portion 18a are fitted together, and thus the elastic member 20 does not exceed fitting looseness between the lens barrel fitting portion 17a and the retaining member fitting portion 18a. Thus, the lens can be stably pressed in the direction of the optical axis O.

Since the retaining member 18 constantly presses the first lens 11 with a reaction force of the elastic force of the elastic member 20, lens deformation due to tightening that occurs from a difference in linear expansion coefficient between the lens barrel 17 and the lens can be absorbed by the elastic member 20 when the environmental temperature is set to be low after assembling.

In the first embodiment, the lens barrel 17, the retaining member 18, and the spacer 16 are made of an aluminum alloy and have a linear expansion coefficient of $26 \times 10^{-6}/°C$. The first lens 11, the second lens 12, the third lens 13, the fourth lens 14, and the fifth lens 15 are made of glass and have a linear expansion coefficient of $7 \times 10^{-6}/°C$.

The length of the spacer 16 in the optical axis direction is set to 1.5 mm, and a length in the optical axis direction from a wall portion 17b of the lens barrel 17 to a contact portion of the retaining member 18 with the first lens 11 is set to 10 mm. The thickness of the optical axis of each of the second lens 12, the third lens 13, the fourth lens 14, and the fifth lens 15 is set to 1 mm. In this case, when the temperature changes by 1° C., a gap between the lens barrel and the lens is 0.16 μm.

Thus, in an environment where the ambient temperature drops by 60° C. from the time of assembling, lens deformation of 9.7 μm occurs in the optical axis direction, but the amount of deformation can be absorbed by the elastic member 20.

On the other hand, in an environment where the ambient temperature rises by 60° C. from the time of assembling, looseness of 9.7 μm occurs in the optical axis direction. However, by assembling the elastic member 20 in a compressed state by a required amount, the retaining member 18 constantly presses and holds the first lens 11 by a reaction force of the elastic force of the elastic member 20, and thus the amount of looseness can be absorbed.

Figure 3:
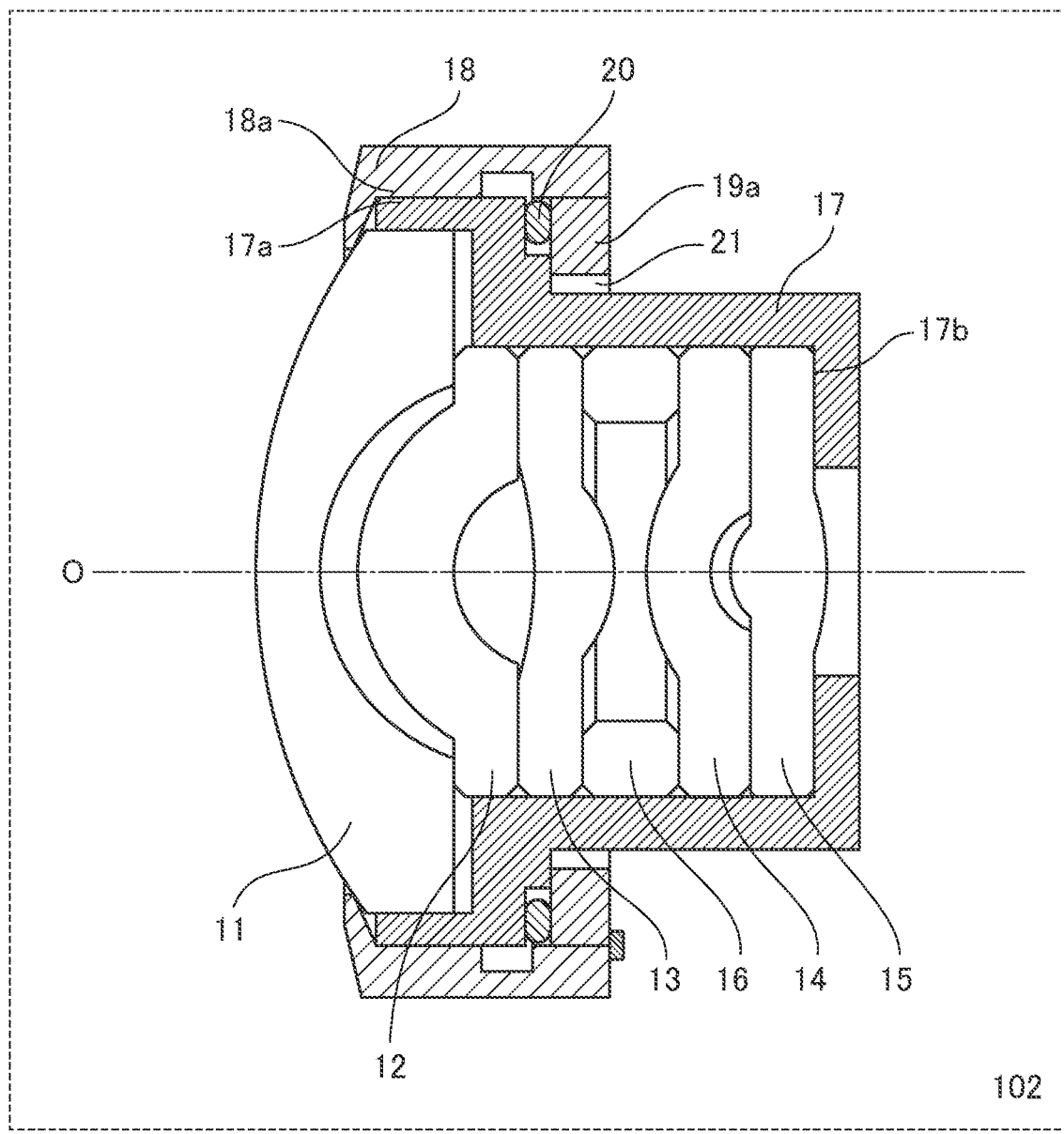
FIG. 3 is a cross-sectional view when a lens barrel 17 and a biased portion 19 of a retaining member 18 according to the first embodiment are brought into contact with each other.

FIG. 3 is a cross-sectional view when the lens barrel 17 and the biased portion 19 of the retaining member 18 according to the first embodiment are brought into contact with each other. That is, in FIG. 3, a part of the biased portion 19 on the object side is held in contact with the lens barrel in the optical axis direction. By assembling the elastic member 20 in a compressed state until the lens barrel 17 and the biased portion 19 are brought into contact with each other, it is possible to apply a constant elastic force to the elastic member 20.

The amount of compression of the elastic member 20 is set to be able to absorb the amount of tightening and the amount of looseness that occur when the temperature changes, in addition to the machining dimensional tolerance of the components of the first lens 11, the second lens 12, the third lens 13, the fourth lens 14, the fifth lens 15, the lens barrel 17, and the spacer 16 in the direction of the optical axis O.

Thereby, the first lens 11 can be stably pressed constantly by the elastic force of the elastic member 20 and the retaining member 18. In addition, the position of the inner diameter of the elastic member 20 is determined in accordance with the outer diameter of the lens barrel 17. Thereby, the position of the elastic member 20 in the radial direction is guided, thereby improving assembly stability.

In the first embodiment, a configuration is adopted in which the elastic member 20 is disposed on the image plane side of the first lens 11 via the lens barrel 17 so that elements for determining the size of the lens barrel unit 102 in the radial direction are set to be only the thicknesses of the first lens 11 and the lens barrel 17 and the thickness of the retaining member 18. Thereby, even in the optical system having a wide viewing angle, the lens can be held without increasing the size of the optical system.

Thus, when the optical device 101 in which a part of the lens barrel outer diameter portion of the lens barrel unit 102 is exposed is installed in the vehicle body as illustrated in FIG. 1, the optical device 101 can be installed to be close to the windshield 106. Thereby, it is possible to reduce an installation space for the optical device 101 with respect to the vehicle body.

In addition, the size of the optical device 101 is reduced, and thus it is also possible to install an anti-reflection hood, which is not illustrated in the drawing, extending from below the optical device 101 toward the windshield 106 without increasing the size of the anti-reflection hood.

As described above, in the first embodiment, the lens barrel 17 that accommodates a plurality of lenses and the retaining member 18 that holds the lenses in the lens barrel 17 by contacting with the object side of at least one of the plurality of the lenses are provided, and the biased portion 19 fixed to the retaining member 18 is provided.

In addition, one side of the biased portion 19 is disposed on an inner side of the retaining member 18 and another side of the biased portion 19 is disposed on an outer side of the lens barrel 17 in the radial direction, and the elastic member 20 disposed between the biased portion 19 and the lens barrel 17 in the optical axis direction is provided. That is, the elastic member 20 is disposed to be sandwiched between the retaining member 18 and the lens barrel 17 in the radial direction of the lens barrel 17, and the elastic member 20 is disposed to be sandwiched between the lens barrel 17 and the biased portion 19 in the direction of the optical axis O.

Further, as described above, the elastic member 20 is assembled in a compressed state, and thus the lens can be held in a state of being constantly pressed against the retaining member 18 by a reaction force of the elastic force of the elastic member 20. That is, the biased portion is biased by the lens barrel via the elastic member in the optical axis direction.

With this configuration, when the lens barrel unit 102 changes in temperature, the elastic member 20 absorbs tightening and looseness of the lens caused by a difference in linear expansion coefficient, and the lens can be held by applying a constant pressure.

Second Embodiment

Although an example of a configuration in which the retaining member and the biased portion are integrated with each other has been described in the first embodiment, a lens barrel unit in a case where a retaining member and a biased portion are configured as separate parts will be described as the second embodiment.

Figure 4:
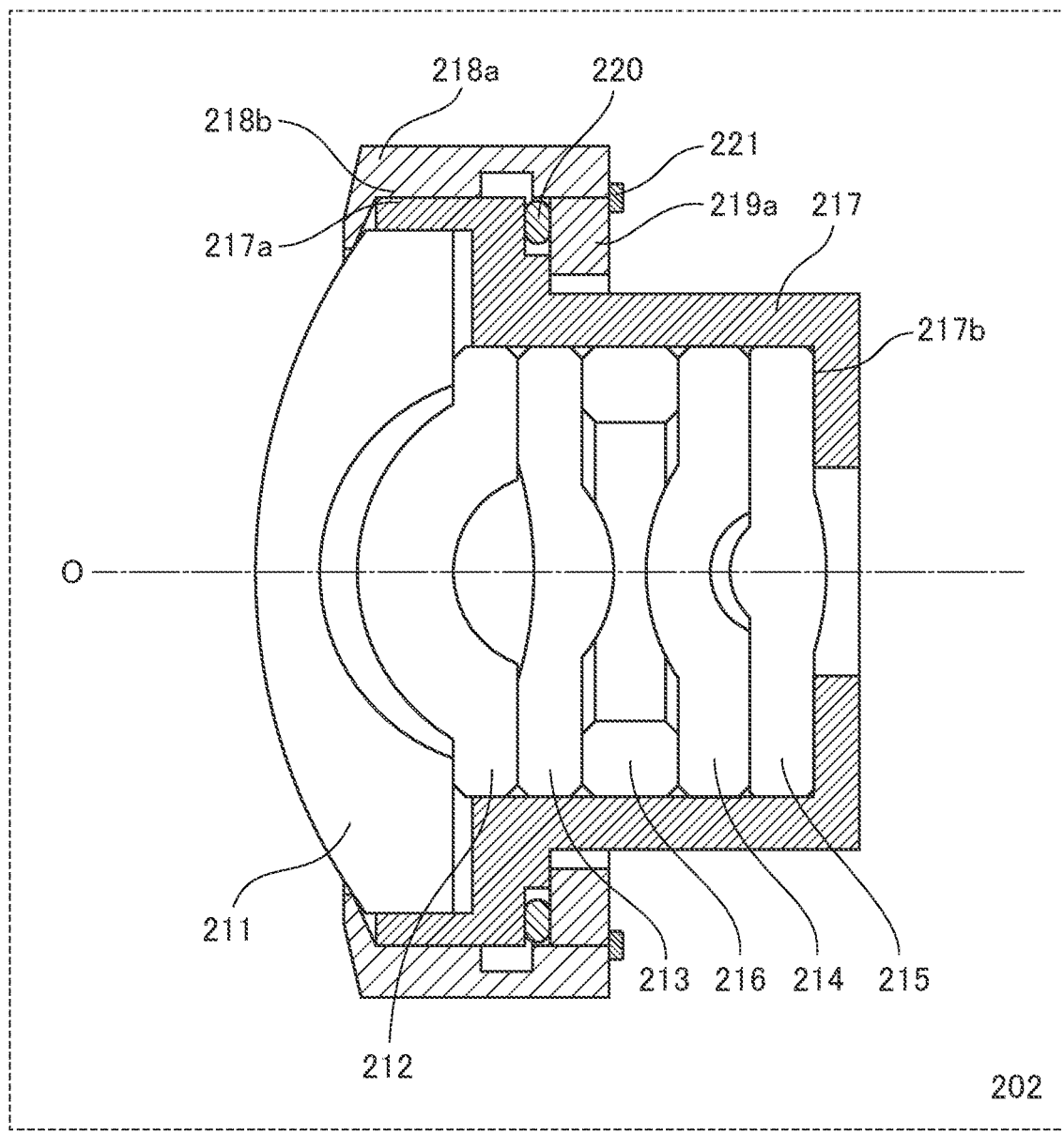
FIG. 4 is a cross-sectional view illustrating a structural example of a lens barrel unit 202 according to a second embodiment.

FIG. 4 is a cross-sectional view illustrating a structural example of a lens barrel unit 202 according to the second embodiment. The lens barrel unit 202 includes a lens barrel 217 that accommodates a plurality of lenses including, for example, a first lens 211, a second lens 212, a third lens 213, a fourth lens 214, and a fifth lens 215 from an object side. In addition, the lens barrel 217 includes a spacer 216 disposed between the third lens 213 and the fourth lens 214.

Further, the lens barrel unit 202 includes a retaining member 218a that comes into contact with the first lens 211 and holds the lens in the lens barrel 217, a biased member 219a as a biased portion, and an elastic member 220.

The first lens 211, the second lens 212, the third lens 213, the fourth lens 214, and the fifth lens 215 in the second embodiment are glass lenses. In addition, the spacer 216, the lens barrel 217, and the retaining member 218a are made of a metal, and the biased member 219a is made of a resin material.

The number of lenses, the number of spacers, and the materials of the lenses, the spacers, and the lens barrel, and the like can be arbitrarily set in accordance with the applications thereof and the like. Such a lens barrel unit 202 may be provided with an "aperture diaphragm" that limits the amount of transmitted light and determines an F-number, which is an index of brightness, and a "light shielding diaphragm" that shields light rays causing ghosts and light rays causing aberrations. However, these are omitted in the second embodiment.

The elastic member 220 is constituted by a spring made of a rubber material such as silicone rubber taking heat resistance into consideration or a metal spring such as a compression coil spring or a wave washer so that its physical properties are not affected even in a harsh in-vehicle temperature environment. The elastic member 220 is sandwiched and held in the direction of an optical axis O between the lens barrel 217 and the biased member 219a fixed to the retaining member 218a.

Here, a method of assembling the lens barrel unit 202 is described. The lens barrel unit 202 accommodates the first lens 211, the second lens 212, the third lens 213, the fourth lens 214, the fifth lens 215, and the spacer 216 inside the lens barrel 217. Next, in this state, the retaining member 218 a is brought into contact with the first lens 211 from the object side, and a lens barrel fitting portion 217 a and a retaining member fitting portion 218 b are fitted together and inserted.

On the other hand, the elastic member 220 and the biased member 219 a are inserted from a side opposite to the object side, and the retaining member 218 a and the biased member 219 a are fixed while the elastic member 220 is compressed. Thereby, the lens can be fixed to the lens barrel 217 in the direction of the optical axis O.

The first lens 211 is held by the retaining member 218a and the biased member 219a in a state where the elastic member 220 is compressed by a required amount, and thus the first lens 211 is constantly pressed against the retaining member 218a by a reaction force of the elastic force of the elastic member 220.

The biased member 219a is fixed, for example, by press-fitting the outer diameter of the biased member 219a into the inner diameter portion of the retaining member 218a. In this case, the retaining member 218a and the biased member 219a may be fixed with an adhesive 221.

Thereby, the retaining member 218a and the biased member 219a are integrated with each other and can receive a reaction force of the elastic force of the elastic member 220 that is compressed at the time of assembling. The adhesive 221 may be a UV curable adhesive, a thermosetting adhesive, an anaerobic adhesive, or the like.

Figure 5:
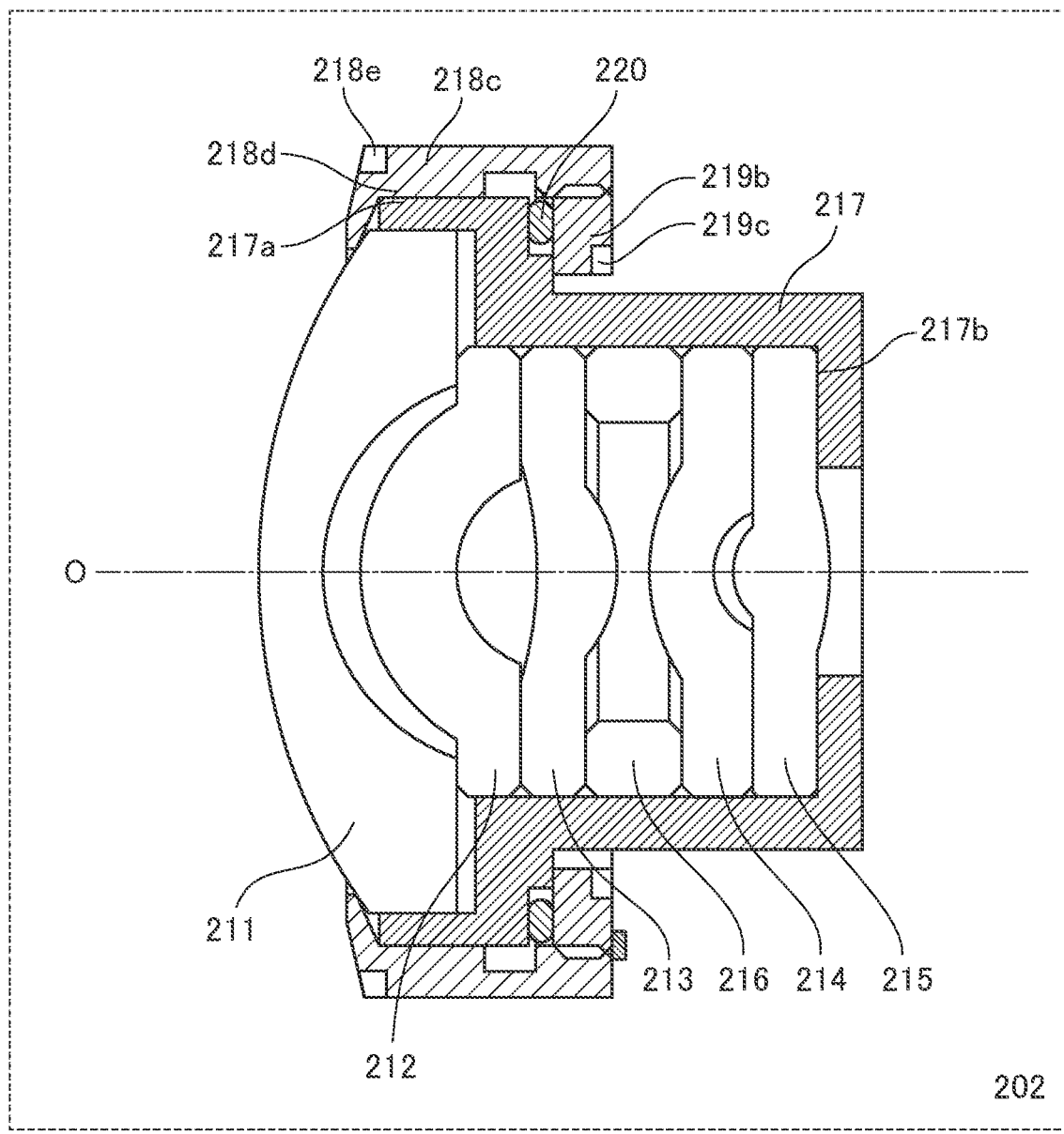
FIG. 5 is a cross-sectional view of the lens barrel unit 202 according to the second embodiment in a case where a biased member is screwed and fixed to a retaining member.

FIG. 5 is a cross-sectional view of the lens barrel unit 202 according to the second embodiment in a case where the biased member is screwed and fixed to the retaining member. A retaining member 218c includes a female screw portion on its inner diameter portion, and the biased member 219b as a biased portion includes a male screw portion on its outer diameter portion.

The female screw portion of the retaining member 218c and the male screw portion of the biased member 219b are screwed together, and thus the retaining member 218c and the biased member 219b can be fixed while the elastic member 220 is compressed by a required amount.

The retaining member 218c and the biased member 219b may be respectively provided with a retaining member groove portion 218e and a biased member groove portion 219c that have optical axis direction components in the depth direction. The retaining member groove portion 218e and the biased member groove portion 219c function as rotation restricting portions when the retaining member 218c and the biased member 219b are screwed together, and coronation of the retaining member 218c and the biased member 219b at the time of assembling can be suppressed.

The shape of the biased member groove portion 219 c is not limited to this shape. The biased member 219 b may have a concave portion or a convex portion having an optical axis direction component in the depth direction on an image plane side. In addition, the shape of the retaining member groove portion 218 e is not limited to this shape. It is sufficient that the retaining member 218 c has a concave portion or a convex portion having an optical axis direction component in the depth direction on the object side.

It is also possible to suppress a positional deviation after assembling by applying a screw locking agent to the male screw portion of the biased member 219b to screw the male screw portion with the female screw portion of the retaining member 218c.

As described above, the optical system having a wide viewing angle has a feature that the first lens 211 closest to the subject, among the plurality of lenses, has a larger outer diameter than the other lenses. However, the elastic member 220 is disposed on the image plane side of the first lens 211 (the side opposite to the object side) via the lens barrel 217.

Thus, the retaining members 218a and 218c can press the first lens 211 without increasing the outermost diameter of the lens barrel unit 202 including the retaining members 218a and 218c.

Further, even when the elastic member 220 is twisted or compressed in a direction orthogonal to the direction of the optical axis O at the time of assembling, the lens barrel fitting portion 217a and the retaining member fitting portions 218b and 218d are fitted together. For this reason, the elastic member 220 can press the lens in the direction of the optical axis O without exceeding fitting looseness between the lens barrel fitting portion 217a and the retaining member fitting portions 218b and 218d.

In addition, the retaining members 218a and 218c constantly press the first lens 211 by a reaction force of the elastic force of the elastic member 220. Thus, when the environmental temperature is set to be low after assembling, the elastic member 220 can absorb lens deformation due to tightening that occurs from a difference in linear expansion coefficient between the lens barrel 217 and the lens.

In the second embodiment, the lens barrel 217, the retaining member 218c, and the spacer 216 are made of an aluminum alloy and have a linear expansion coefficient of $26 \times 10^{-6}/°C$. The first lens 211, the second lens 212, the third lens 213, the fourth lens 214, and the fifth lens 215 are made of glass and have a linear expansion coefficient of $7 \times 10^{-6}/°C$.

The length of the spacer 216 in the optical axis direction is set to 1.5 mm, and a length in the optical axis direction from a wall portion 217b of the lens barrel 217 to a contact portion of the retaining member 218c with the first lens 211 is set to 10 mm. The thickness of the optical axis of each of the second lens 212, the third lens 213, the fourth lens 214, and the fifth lens 215 is set to 1 mm. In this case, when the temperature changes by 1° C., a gap between the lens barrel and the lens is 0.16 km.

Thus, in an environment where the ambient temperature drops by 60° C. from the time of assembling, lens deformation of 9.7 μm occurs in the optical axis direction, but the amount of deformation can be absorbed by the elastic member 220.

On the other hand, in an environment where the ambient temperature rises by 60° C. from the time of assembling, looseness of 9.7 μm occurs in the optical axis direction. However, by assembling the elastic member 220 in a compressed state by a required amount, the retaining member 218c constantly presses and holds the first lens 211 by a reaction force of the elastic force of the elastic member 220, and thus the amount of looseness can be absorbed.

In FIG. 5, the retaining member 218c and the fixed biased member 219b are assembled in a state where the elastic member 220 is compressed until the retaining member 218c and the fixed biased member 219b are brought into contact with the lens barrel 217. Thereby, it is possible to apply a constant elastic force to the elastic member 220 without being affected by the machining dimensional tolerance of the components of the lenses and the spacer in the direction of the optical axis O.

The amount of compression of the elastic member 220 is set to be able to absorb the amount of tightening and the amount of looseness that occur when the temperature changes. Thereby, an elastic force is applied to the elastic member 220, and the retaining member 218c can stably press the first lens 211 constantly. In addition, the position of the inner diameter of the elastic member 220 is determined in accordance with the outer diameter of the lens barrel 217. Thereby, the position of the elastic member 220 in the radial direction is guided, thereby improving assembly stability.

In the second embodiment, a configuration is adopted in which the elastic member 220 is disposed on the image plane side of the first lens 211 via the lens barrel 217. Thus, elements for determining the size of the lens barrel unit 202 in the radial direction are set to be only the thicknesses of first lens 211 and the lens barrel 217 and the thickness of the retaining member 218c. Thereby, even in the optical system having a wide viewing angle, the lens can be held without increasing the size of the optical system.

Thereby, it is possible to reduce an installation space for an optical device 101 with respect to the vehicle body, the optical device 101 being configured such that a part of the outer diameter portion of the lens barrel of the lens barrel unit 202 is exposed. Further, the size of the optical device 101 is reduced, and thus it is also possible to install an anti-reflection hood, which is not illustrated in the drawing, extending from below the optical device 101 toward a windshield 106 without increasing the size of the anti-reflection hood.

According to the above-described embodiment, it is possible to suppress an increase in the diameter of the lens barrel unit on the object side by disposing the elastic member in a gap generated due to a diameter difference between the largest lens on the object side, which is a feature of a camera having a wide viewing angle, and the subsequent lenses. In addition, a configuration is adopted in which the retaining member constantly presses the lens by compressing the elastic member by a required amount in advance and giving an elastic force to the elastic member, and it is possible to absorb looseness and tightening when the temperature changes.

Third Embodiment

In the first and second embodiments, an example of a configuration in which the retaining member presses the lens on the object side and the biased portion presses the lens barrel on the image plane side via the elastic body has been described. However, in a third embodiment, an example in which a retaining member presses a part of a lens on an image plane side and elastically presses a part of another lens on an object side will be described.

In the case of a configuration in which an elastic member is sandwiched between a pressing ring and a lens, there is a possibility that the elastic member will be twisted due to the rotation of the pressing ring. When the elastic member is held in a twisted state, a uniform force cannot be applied from the pressing ring to the lens through the elastic member, resulting in a possibility that the accuracy of lens holding and optical performance will deteriorate.

Consequently, even in the third embodiment, it is possible to suppress twisting deformation of the elastic member, apply a uniform force to the lens, and reduce the diameter of a lens barrel unit on an object side. For this reason, at least one or more lenses, a lens barrel that accommodates the lenses, and a pressing ring for holding the lenses are provided, the lens barrel includes a wall portion on the object side with respect to the lenses, and an elastic member sandwiched between the wall portion and a first lens disposed closest to the subject among the lenses is provided.

The first lens is held apart from the wall portion, and the pressing ring is configured to be screwed to an outer diameter portion of the lens barrel on a side opposite to the wall portion and the first lens in the optical axis direction and held while abutting against a predetermined contact surface in contact with the pressing ring in the optical axis direction. The contact surface is provided on the lens barrel.

In the third embodiment, the elastic member is held by being sandwiched between the wall portion provided on the object side of the lens barrel and the first lens disposed closest to the subject, and thus the elastic member can apply a uniform force to the lens to hold the lens without causing deformation, such as twisting, due to the rotation of the pressing ring.

In addition, the pressing ring is disposed on a side opposite to the wall portion in the optical axis direction with respect to the first lens, and thus the diameter of the lens barrel unit on the object side is determined only by the diameter of the lens and the thickness of the lens barrel, thereby making it possible to reduce the diameter of the lens barrel unit. Thereby, it is possible to reduce an installation space on a vehicle body. The third embodiment will be described in detail below.

Figure 6:
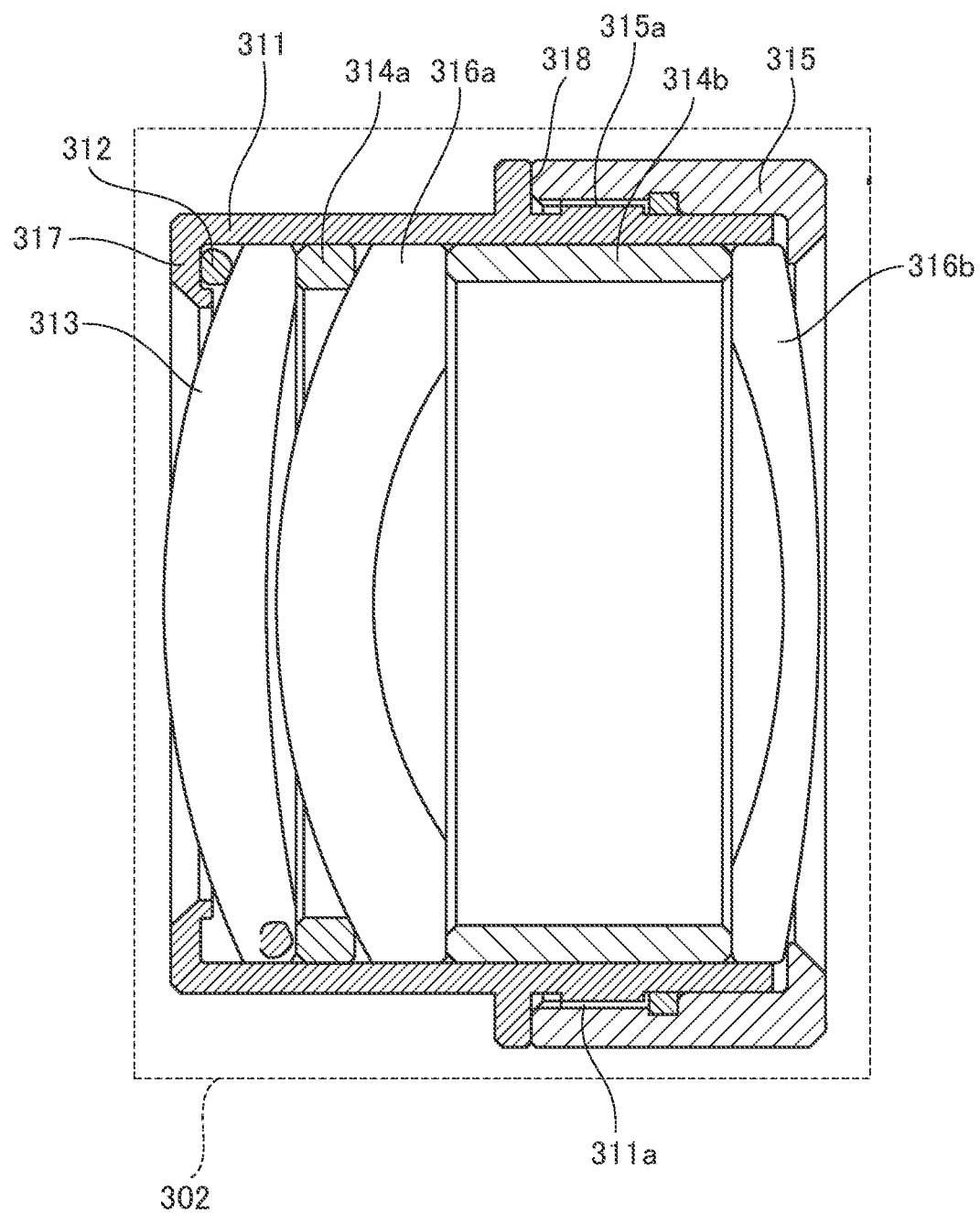
FIG. 6 is a cross-sectional view illustrating the structure of a lens barrel unit 302 according to a third embodiment.

FIG. 6 is a cross-sectional view illustrating the structure of a lens barrel unit 302 according to the third embodiment. The lens barrel unit 302 includes an elastic member 312, a first lens 313 disposed closest to a subject, a lens 316a, a lens 316b, and a lens barrel 311 that accommodates spacers 314a and 314b sandwiched between the lenses. Further, the lens barrel unit 302 includes a pressing ring 315 that is screwed to the lens barrel 311 and holds the lens 316b in the lens barrel 311.

The lens barrel 311, the spacers 314a and 314b, and the pressing ring 315 are made of a metal material or a resin material, and the first lens 313 and the lenses 316a and 316b are made of a transparent material such as glass or a resin material. The lens barrel 311 includes a wall portion 317 and a male screw portion 311a on the outer diameter portion. The wall portion 317 is provided on the object side with respect to the first lens 313 disposed closest to the subject and has a surface with which the elastic member 312 comes into contact.

For example, in the case of a lens barrel for a camera that has a function of imaging the front of a vehicle and following a preceding vehicle, it is necessary to narrow a viewing angle and be able to image a distant place in order to improve functionality when driving on highways. However, as in the third embodiment, even when the wall portion 317 is provided, effective light rays are not blocked, and a camera function for imaging a distant place can be sufficiently achieved.

The elastic member 312 is made of a rubber material such as silicone rubber that takes heat resistance into consideration so that its physical properties are not affected even in a harsh in-vehicle temperature environment, and is sandwiched and held between the first lens 313 and the wall portion 317.

The pressing ring 315 includes a female screw portion 315a and is disposed on a side (image plane side) opposite to the wall portion 317 with respect to the first lens 313 in the optical axis direction. Then, the female screw portion 315a is screwed (fastened) to the male screw portion 311a until the female screw portion 315a abuts against the contact surface 318 while being in contact with the peripheral portion of the lens 316b disposed closest to the image plane.

In the third embodiment, the contact surface 318 is provided on the lens barrel 311. Thereby, the positions of the first lens 313, the spacer 314a, the lens 316a, the spacer 314b, and the lens 316b in the optical axis direction are determined. In this case, the elastic member 312 is deformed by being sandwiched in the wall portion 317 due to the pressing of the first lens 313 through the screwing of the pressing ring 315, but an elastic force of the elastic member 312 is absorbed.

In the third embodiment, the pressing ring 315 is screwed to the male screw portion 311a on the outer diameter portion of the lens barrel 311 by the female screw portion 315a. Thus, a distance between an R2 surface of the lens 316b on the optical axis and the image sensor included in the electric device 104 can be shortened compared to a case where the pressing ring 315 is screwed to the inner diameter of the lens barrel 311. Thereby, it is possible to reduce the length of the lens barrel unit 302 in the optical axis direction and improve optical performance because the effects of field curvature aberration and the like can be reduced.

In addition, the rotation of the pressing ring 315 due to screwing is not transmitted to the elastic member 312 at the time of assembling because it passes through the lenses and the spacers, and the elastic member 312 is pressed by the first lens 313 with a uniform force, whereby the elastic member 312 can be held without being twisted and deformed. Thereby, it is possible to suppress deterioration in the accuracy of holding the lens due to the elastic member.

Since the first lens 313 is held apart from the wall portion 317, lens deformation due to tightening that occurs from a difference in linear expansion coefficient between the lens barrel 311 and the lens can be absorbed by the elastic member 312 when the environmental temperature is set to be low after assembling.

In the third embodiment, the lens barrel 311, the pressing ring 315, the spacer 314a, and the spacer 314b are made of an aluminum alloy and have a linear expansion coefficient of 26×10^-6/° C. The first lens 313, the lens 316a, and the lens 316b are made of glass and have a linear expansion coefficient of 7×10^-6/° C.

The lengths of the spacers 314a and 314b in the optical axis direction are set to 2 mm and 9 mm, respectively, and a distance from the wall portion 317 of the lens barrel 311 to a contact portion of the pressing ring 315 with the lens 316b is set to 19 mm. For simplification of calculation, and because the elastic member 312 is easily deformable, the elastic member 312 is excluded from the calculation. In this case, when the temperature changes by 1° C., a gap difference of 0.16 μm occurs between the lens barrel and the lens.

Thus, in an environment where the ambient temperature drops by 60° C. from the time of assembling, lens deformation of 9.6 μm occurs in the optical axis direction. However, the first lens 313 and the wall portion 317 are held apart from each other, and thus the amount of deformation can be absorbed by the elastic member 312.

Further, in an environment where the ambient temperature rises by 60° C. from the time of assembling, looseness of 9.6 μm occurs in the optical axis direction. However, the elastic member 312 is sandwiched in the wall portion 317 due to the pressing of the first lens 313 through the screwing of the pressing ring 315 at the time of assembling, and the elastic member 312 is held in an elastic state, whereby the amount of looseness can be absorbed.

Further, the pressing of the first lens 313 through the screwing of the pressing ring 315 leads to close contact between the wall portion 317 and the elastic member 312 and between the elastic member 312 and the first lens 313. Thereby, the sealing performance of the lens barrel unit 302 is improved, and waterproofness and moisture resistance can be obtained.

In the third embodiment, the elastic member 312 has an annular shape, and an annular groove portion (groove shape) capable of accommodating the elastic member is provided in the wall portion 317 of the lens barrel 311, whereby it is possible to suppress a positional deviation in a direction perpendicular to the optical axis of the elastic member 312 and deformation in the outer peripheral direction.

In the third embodiment, the pressing ring 315 is disposed on a side (image plane side) opposite to the wall portion 317 of the lens barrel 311 with respect to the first lens 313 in the optical axis direction, and thus elements for determining the size of the lens barrel unit 302 on the object side in the radial direction can be set to be only the outer diameter of the lens and the thickness of the lens barrel.

That is, when the lens barrel 311 of the lens barrel unit 302 as illustrated in FIG. 1 is exposed from the housing 103, the size of the lens barrel unit 302 in the radial direction can be made smaller than when the pressing ring 315 is disposed on the object side. Thus, the optical device 101 can be installed closer to the windshield 106, and the installation space for the optical device 101 with respect to the vehicle body can be reduced.

As described above, in the third embodiment, the wall portion 317 of the lens barrel 311 is provided on the object side, and the elastic member 312 is held between the first lens 313 disposed closest to the subject and the wall portion 317. Thus, the elastic member 312 is not affected by the rotation of the pressing ring 315 and is held without being twisted and deformed.

Thereby, it is possible to suppress deterioration in the accuracy of holding the lens at the time of assembling when the elastic member is used to alleviate looseness and tightening in the optical axis direction when the environmental temperature changes. In addition, the pressing ring 315 is disposed on a side opposite to the object side with respect to the first lens 313 in the optical axis direction, and thus it is possible to reduce the size of the lens barrel unit 302 on the object side in the radial direction and reduce an installation space for the optical device 101 with respect to the vehicle body.

Fourth Embodiment

Although an example of a configuration in which one pressing ring is provided for the lens barrel has been described in the third embodiment, a lens barrel in which two or more pressing rings are disposed will be described in a fourth embodiment.

Figure 7:
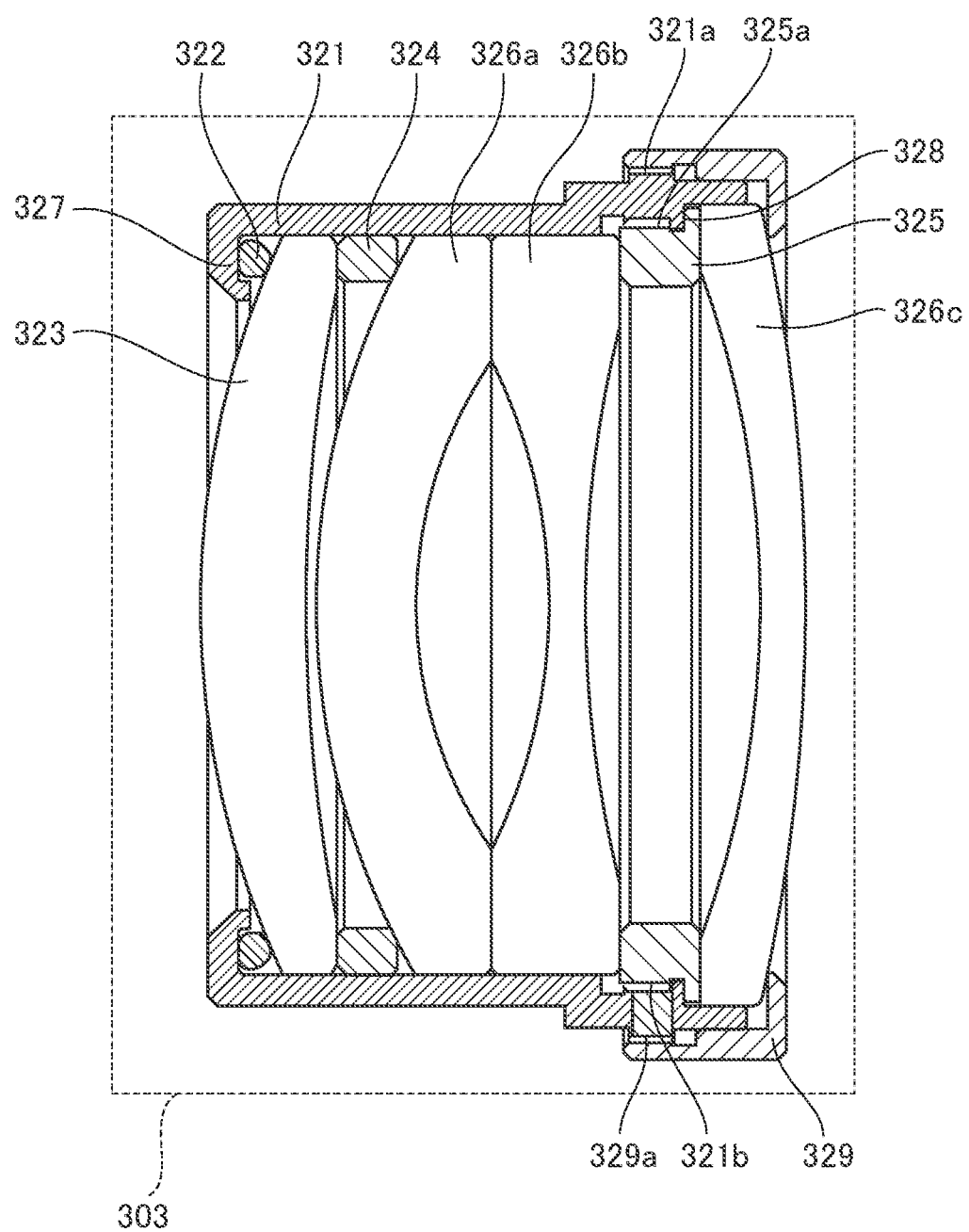
FIG. 7 is a cross-sectional view illustrating the structure of a lens barrel unit 303 according to a fourth embodiment.

FIG. 7 is a cross-sectional view illustrating the structure of a lens barrel unit 303 according to the fourth embodiment. The lens barrel unit 303 includes an elastic member 322, a first lens 323 disposed closest to a subject, a lens 326a, a lens 326b, a lens 326c, and a lens barrel 321 that accommodates a spacer 324 sandwiched between the first lens 323 and the lens 326a. Further, the lens barrel unit 303 includes a pressing ring 325 and a pressing ring 329 screwed together in the lens barrel 321.

The lens barrel 321, the spacer 324, the pressing ring 325, and the pressing ring 329 are made of a metal material or a resin material, and the first lens 323, the lens 326a, the lens 326b, and the lens 326c are made of a transparent material such as glass or a resin material.

The lens barrel 321 includes a wall portion 327, a male screw portion 321 a on the outer diameter portion, and a female screw portion 321 b on the inner diameter portion. The wall portion 327 is provided on the object side with respect to the first lens 323 and has a surface with which the elastic member 322 comes into contact.

The elastic member 322 is made of a rubber material such as silicone rubber that takes heat resistance into consideration so that its physical properties are not affected even in a harsh in-vehicle temperature environment, and is sandwiched and held between the first lens 323 and the wall portion 327.

The pressing ring 325 includes a male screw portion 325a, is disposed on a side (image plane side) opposite to the wall portion 327 with respect to the first lens 323, and is screwed (fastened) to the female screw portion 321b until the pressing ring 325 abuts against a contact surface 328 while being in contact with the peripheral portion of the lens 326b disposed closest to the image plane.

In the fourth embodiment, the contact surface 328 is provided on the lens barrel 321. Thereby, the positions of the first lens 323, the spacer 324, the lens 326a, and the lens 326b in the optical axis direction are determined. In this case, the elastic member 322 is deformed by being sandwiched in the wall portion 327 due to the pressing of the first lens 323 through the screwing of the pressing ring 325, but an elastic force of the elastic member 322 is absorbed.

The rotation of the pressing ring 325 due to screwing is not transmitted to the elastic member 322 because it passes through the lenses and the spacer, and the elastic member 322 is pressed by the first lens 323 with a uniform force, whereby the elastic member 322 can be held without being twisted and deformed. Thereby, it is possible to suppress deterioration in the accuracy of holding the lens due to the elastic member.

The lens 326c is accommodated in the lens barrel 321 while being in contact with the pressing ring 325 of which the position in the optical axis direction is determined by abutting against the contact surface 328. Further, a female screw portion 329a of the pressing ring 329 is screwed (fastened) to the male screw portion 321a of the lens barrel 321, and thus the lens 326c is held in a state where the position in the optical axis direction is determined.

Since the first lens 323 is held apart from the wall portion 327, lens deformation due to tightening that occurs from a difference in linear expansion coefficient between the lens barrel 321 and the lens can be absorbed by the elastic member 322 when the environmental temperature is set to be low after assembling.

Here, description is given of the components of the first lens 323, the lens 326a, and the lens 326b in which looseness and tightening occur greatly particularly when the environmental temperature changes. The lens barrel 321, the pressing ring 325, and the spacer 324 are made of an aluminum alloy and have a linear expansion coefficient of $26 \times 10^{-6}/°$ C.

The first lens 323, the lens 326a, and the lens 326b are made of glass and have a linear expansion coefficient of $7 \times 10^{-6}/°$ C. The length of the spacer 324 in the optical axis direction is set to 2 mm, and a distance from the wall portion 327 of the lens barrel 321 to a contact portion of the pressing ring 325 with the lens 326b is set to 13 mm in the optical axis direction.

For simplification of calculation, and because the elastic member 322 is easily deformable, the elastic member 322 is excluded from the calculation. In this case, when the temperature changes by 1° C., a gap difference of 0.22 μm occurs between the lens barrel and the lens.

Thus, in an environment where the ambient temperature drops by 60° C. from the time of assembling, lens deformation of 13.2 μm occurs in the optical axis direction. However, the first lens 323 and the wall portion 327 are held apart from each other, and thus the amount of deformation can be absorbed by the elastic member 322.

Further, in an environment where the ambient temperature rises by 60° C. from the time of assembling, looseness of 13.2 μm occurs in the optical axis direction. However, the elastic member 322 is sandwiched in the wall portion 327 due to the pressing of the first lens 323 through the screwing of the pressing ring 325 at the time of assembling, and the elastic member 322 is held in an elastic state, whereby the amount of looseness can be absorbed.

Further, in the fourth embodiment, the pressing ring 325 and the pressing ring 329 are disposed on a side (image plane side) opposite to the wall portion 327 with respect to the first lens 323 of the lens barrel 321 in the optical axis direction. Thus, elements for determining the size of the lens barrel unit 303 on the object side in the radial direction can be set to be only the outer diameter of the lens and the thickness of the lens barrel.

In other words, the size of the lens barrel unit 303 in the radial direction can be made smaller than when the pressing ring is disposed on the object side, and thus the optical device including the lens barrel unit 303 can be installed closer to a windshield of a vehicle. Thereby, the installation space for the optical device with respect to the vehicle body can be reduced.

Further, the wall portion 327 of the lens barrel 321 is provided on the object side, and the elastic member 322 is held between the first lens 323 disposed closest to the subject and the wall portion 327. Thus, the elastic member 322 is not affected by the rotation of the pressing ring 325 and is held without being twisted and deformed. Thereby, it is possible to suppress deterioration in the accuracy of holding the lens at the time of assembling when the elastic member is used to alleviate looseness and tightening in the optical axis direction when the environmental temperature changes.

Further, the pressing ring 329 is disposed on a side opposite to the wall portion 327 with respect to the first lens 323 in the optical axis direction, and thus it is possible to reduce the size of the lens barrel unit 303 on the object side in the radial direction. Thus, it is possible to reduce an installation space for the optical device including the lens barrel unit 303 with respect to the vehicle body.

Fifth Embodiment

Although an example of a configuration in which the pressing ring is made to directly abut against the lens barrel has been described in the third and fourth embodiments, an example of a configuration in which a pressing ring contacts with a lens barrel via a ring member will be described in a fifth embodiment.

Figure 8:
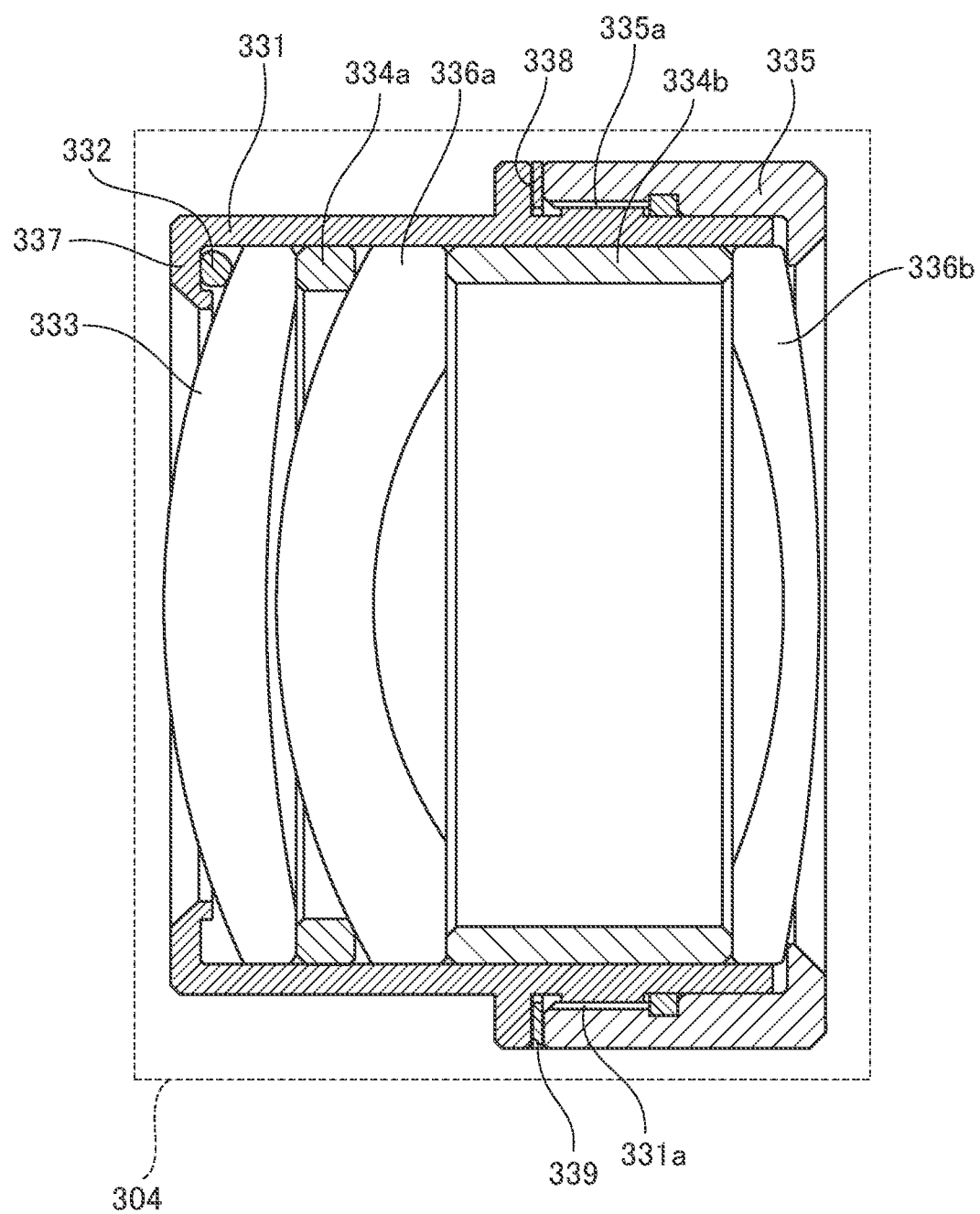
FIG. 8 is a cross-sectional view illustrating the structure of a lens barrel unit 304 according to a fifth embodiment.

FIG. 8 is a cross-sectional view illustrating the structure of a lens barrel unit 304 according to the fifth embodiment. The lens barrel unit 304 includes an elastic member 332, a first lens 333 disposed closest to the subject, a lens 336a, a lens 336b, and a lens barrel 331 that accommodates a spacer 334a and a spacer 334b sandwiched between the lenses. In addition, the lens barrel unit 304 includes a pressing ring 335 that is screwed to the lens barrel 331.

The lens barrel 331, the spacer 334a, the spacer 334b, and the pressing ring 335 are made of a metal material or a resin material, and the first lens 333, the lens 336a, and the lens 336b are made of a transparent material such as glass or a resin material.

The lens barrel 331 includes a wall portion 337 and a male screw portion 331a on the outer diameter portion. The wall portion 337 is provided on an object side with respect to the first lens 333 and has a surface with which the elastic member 332 comes into contact. The elastic member 332 is made of a rubber material such as silicone rubber that takes heat resistance into consideration so that its physical properties are not affected even in a harsh in-vehicle temperature environment, and is sandwiched and held between the first lens 333 and the wall portion 337.

In the fifth embodiment, a ring member 339 sandwiched between the lens barrel 331 and the pressing ring 335 is provided. The pressing ring 335 includes a female screw portion 335a, is disposed on a side opposite to the wall portion 337 with respect to the first lens 333, and is screwed (fastened) to the male screw portion 331a of the lens barrel 331 until the pressing ring 335 abuts against a contact surface 338 while being in contact with the lens 336b.

In the fifth embodiment, the contact surface 338 is provided on the ring member 339. The ring member 339 is made of a metal material or a resin material. Thereby, the positions of the first lens 333, the spacer 334a, the lens 336a, the spacer 334b, and the lens 336b in the optical axis direction are determined.

In this case, the elastic member 332 is deformed by being sandwiched between the wall portion 337 and the elastic member 332 due to the pressing of the first lens 333 through the screwing of the pressing ring 335, but an elastic force of the elastic member 332 is absorbed.

Further, the pressing ring 335 is disposed on a side opposite to the wall portion 337 with respect to the first lens 333 in the optical axis direction, and thus it is possible to reduce the size of the lens barrel unit 304 on the object side in the radial direction. Thus, the optical device including the lens barrel unit 304 can be brought closer to an inclined windshield, and an installation space for the optical device with respect to the vehicle body can be reduced.

The parts constituting the lens barrel unit 304 have dimensional tolerances in machining during manufacturing. That is, the lens barrel unit 304 is designed in consideration of the dimensional tolerance of the wire diameter of the elastic member 332 and the dimensional tolerances of the lens, the spacer, and the lens barrel in the optical axis direction so as to give an appropriate elastic force to the elastic member 332.

However, there is a possibility that an elastic force will become excessive due to the above-described dimensional tolerance and the wire diameter and hardness of the elastic member 332, and the excessive elastic force of the elastic member 332 may cause lens deformation and cracking.

On the other hand, in the fifth embodiment, a ring member 339 is provided between the lens barrel 331 and the pressing ring 335, and the contact surface 338 is provided on the ring member 339. By increasing the thickness of the ring member 339 in the optical axis direction, a distance between an R1 surface of the first lens 333 and a contact surface of the pressing ring 335 with the lens 336b is increased, and an elastic force of the elastic member 332 can be reduced. Thereby, it is possible to suppress deterioration in the accuracy of holding the lens due to the elastic member.

In addition, the wall portion 337 of the lens barrel 331 is provided on the object side, and the elastic member 332 is held between the wall portion 337 and the first lens 333 disposed closest to the subject. Thus, the elastic member 332 is not affected by the rotation of the pressing ring 335 and is held without being twisted and deformed.

In addition, by providing a ring member 339 between the lens barrel 331 and the pressing ring 335 and providing the ring member 339 on the contact surface 338, the elastic member 332 can be prevented from having an excessive elastic force depending on the dimensional tolerance of each part and the material and hardness of the elastic member 332. Thus, it is possible to suppress deterioration in the accuracy of holding the lens at the time of assembling when the elastic member is used to alleviate looseness and tightening in the optical axis direction when the environmental temperature changes.

Further, the pressing ring 335 is disposed on a side opposite to the wall portion 337 with respect to the first lens 333 in the optical axis direction, and thus it is possible to reduce the size of the lens barrel unit 304 on the object side in the radial direction. Thus, it is possible to reduce an installation space for the optical device including the lens barrel unit 304 with respect to the vehicle body.

In the above-described embodiments, the number of lenses in the lens barrel unit may be any number as long as it is one or more. Although the lens barrel unit is applied to an in-vehicle camera used for driving assistance and automatic driving, this is not limiting, and the lens barrel unit may be applied to an optical device, an imaging device, or an imaging system other than an in-vehicle camera. Further, the lens barrel units in the above-described embodiments are suitable not only for an in-vehicle camera for imaging the front of a vehicle or the like, but also applicable to an imaging system such as an in-vehicle camera for imaging the rear or the side of a vehicle or the like.

Sixth Embodiment

Figure 9:
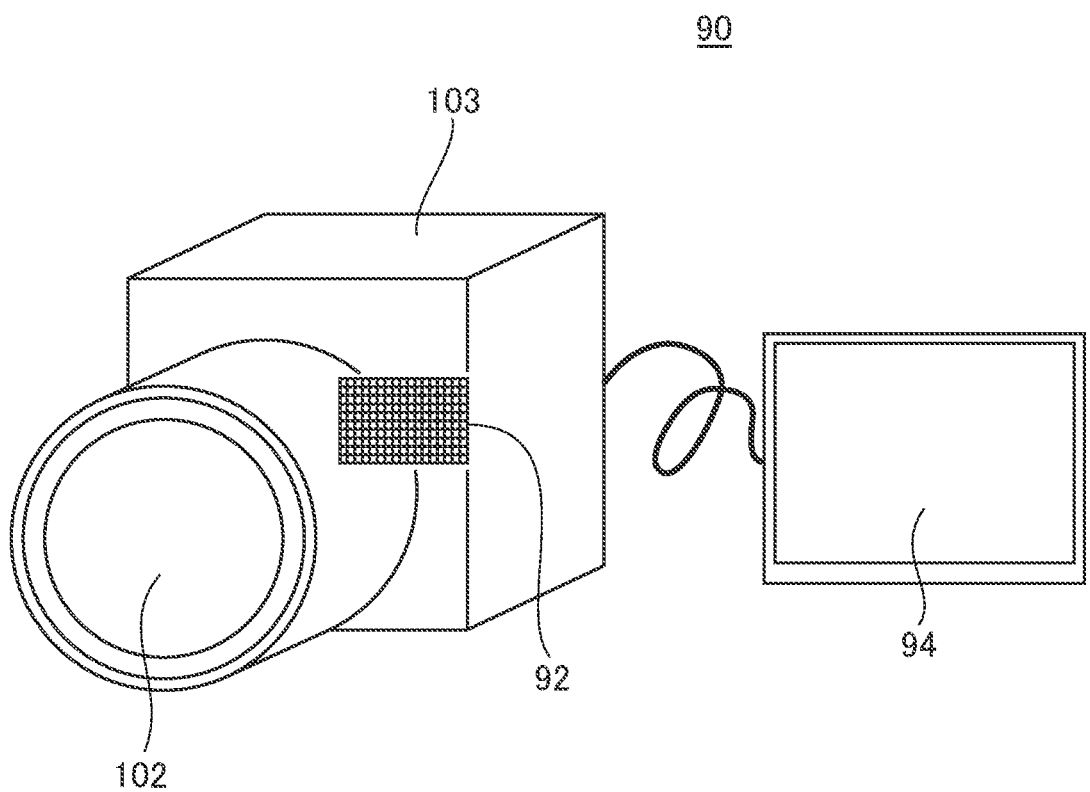
FIG. 9 is a schematic diagram of an imaging device according to a sixth embodiment.

FIG. 9 is a schematic diagram of an imaging device according to a sixth embodiment. An imaging device 90 as an optical device 101 according to the sixth embodiment includes the lens barrel unit 102 according to the above-described embodiment, a light receiving element 92 that photoelectrically converts an image of an object formed by an optical system 201 in the lens barrel unit 102, and a housing 103 that holds the light receiving element 92. That is, the imaging device includes a lens device and an imaging element that images an object through the lens device.

The lens barrel unit 102 is held by a lens barrel (holding member) and connected to the housing 103. As illustrated in FIG. 9, the housing 103 may be connected to a display unit 94 that displays an image acquired by the light receiving element 92. As the light receiving element 92, an imaging element (photoelectric conversion element) such as a CCD sensor or a CMOS sensor can be used.

When the imaging device 90 is used as a distance measuring device, for example, an imaging device (imaging surface phase difference sensor) having pixels capable of photoelectrically converting a light beam from an object into two light beams can be adopted as the light receiving element 92. When a subject is located on the focal plane of the optical system 201, a positional deviation does not occur in images corresponding to the two split light beams on the image plane of the optical system 201.

However, when the subject is located at a position other than the focal plane of the optical system 201, a positional deviation occurs in each image. In this case, since a positional deviation in each image corresponds to the amount of displacement of the subject from the focal plane, the amount of positional deviation and the direction of the positional deviation of each image can be acquired using the imaging surface phase difference sensor, and thus a distance to the subject can be measured.

The lens barrel unit 102 and the housing 103 may be configured to be detachable from each other. That is, the lens barrel unit 102 and the lens barrel may be configured as an interchangeable lens (lens device).

The lens barrel unit 102 and the optical system 201 according to the above-described embodiment can be applied to imaging devices such as a digital still camera, a silver salt film camera, a video camera, an in-vehicle camera, and a surveillance camera. Further, the lens barrel unit 102 and the optical system 201 can also be applied to various optical devices such as a telescope, a binocular, a projector (projection device), and a digital copier.

Figure 10A:
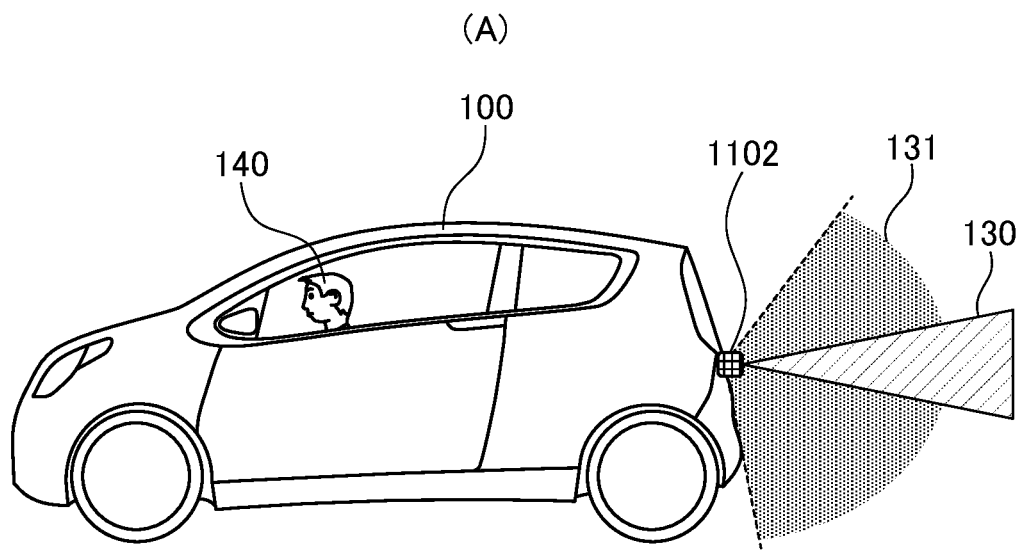
FIGS. 10A and 10B are schematic diagrams of a movable apparatus according to the sixth embodiment and diagrams illustrating optical characteristics of an optical system.
Figure 10B:
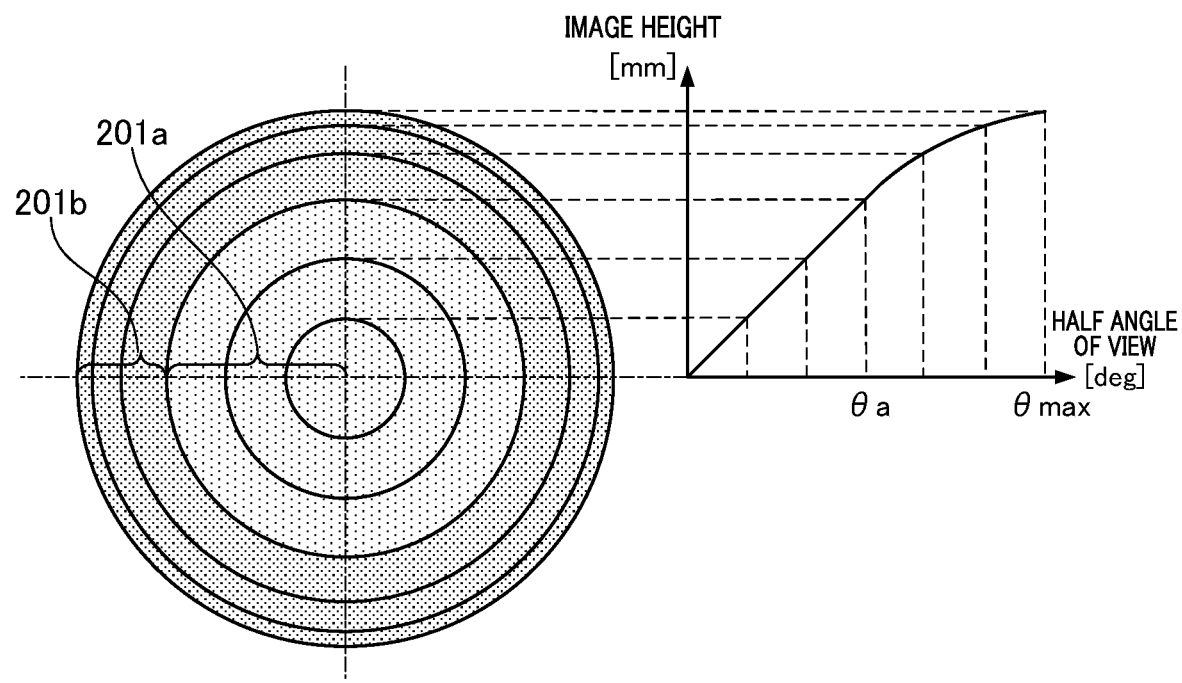

FIGS. 10A and 10B are schematic diagrams of a movable apparatus according to the sixth embodiment and diagrams illustrating optical characteristics of an optical system. FIG. 10A is a schematic diagram of a movable apparatus 100 according to an embodiment of the present disclosure and an imaging device 1102 as an in-vehicle camera mounted on the movable apparatus 100. FIG. 10A illustrates a case where the movable apparatus 100 is an automobile (vehicle). The movable apparatus 100 can move while holding the imaging device.

The movable apparatus 100 includes an in-vehicle imaging system (driving assistance device), which is not illustrated in the drawing, for assisting a user 140 (driver, fellow passenger, or the like) of the movable apparatus 100 using an image acquired by the imaging device 1102.

Although a case where the imaging device 1102 is installed to image the rear of the movable apparatus 100 will be described in the sixth embodiment, the imaging device 1102 may be installed to image the front of the movable apparatus 100 as described with reference to FIG. 1. In addition, two or more imaging devices 1102 may be installed at two or more locations of the movable apparatus 100.

The imaging device 1102 includes an optical system 201 and an imaging unit 210 according to any one of the embodiments described above. In the sixth embodiment, the optical system 201 is an optical system having different image forming magnifications (different-angle-of-view lens) in a first angle of view (first field of view) 130 and a second angle of view (second field of view) 131 that is larger than the first angle of view 130 outside thereof.

An imaging surface (light receiving surface) of the imaging unit 210 includes a first region for imaging an object included in the first angle of view 130 and a second region for imaging an object included in the second angle of view 131 outside the first region. In this case, the number of pixels per unit angle of view in the first region is larger than the number of pixels per unit angle of view in the second region excluding the first region.

In other words, a resolution at the first angle of view (first region) of the imaging device 1102 is higher than a resolution at the second angle of view (second region).

Optical characteristics of the optical system 201 will be described in detail below. In a left drawing in FIG. 10B, an image height y [mm] at each half angle of view θ [deg.] on the imaging surface of the imaging unit 210 is shown in a contour shape. In a right drawing in FIG. 10B, a relationship (projection characteristics of the optical system 201) between each half angle of view θ and the image height y in a first quadrant of the left drawing is shown as a graph.

As illustrated in FIG. 10B, the optical system 201 is configured such that a projection characteristic y(θ) differs between an angle of view less than a predetermined half angle of view θa and an angle of view equal to or greater than the predetermined half angle of view θa. Thus, the amount of increase (resolution) in the image height y with respect to the half angle of view θ per unit also differs for each angle of view. A local resolution of the optical system 201 is represented by a differential value dy(θ)/dθ of the projection characteristic y(θ) with respect to the half angle of view θ.

In the left drawing of FIG. 10B indicates that the larger the interval between the contour lines of the image height y with respect to each half angle of view θ, the higher the resolution. In addition, in the right drawing of FIG. 10B, it is indicated that the larger an inclination of the graph of the projection characteristic y(θ), the higher the resolution.

In the left drawing of FIG. 10B, a first region 201a, which is the central region, corresponds to an angle of view less than the half angle of view θa, and a second region 201b, which is a peripheral region, corresponds to an angle of view equal to or greater than the half angle of view θa. An angle of view less than the half angle of view θa corresponds to the first angle of view 130 in FIG. 10A, and an angle of view, which is obtained by adding up an angle of view less than the half angle of view θa and an angle of view equal to or greater than the half angle of view θa, corresponds to the second angle of view 131 in FIG. 10A.

As described above, the first region 201a is a high resolution and low distortion region, and the second region 201b is a low resolution and high distortion region. The value θa/θmax of a ratio of a half angle of view θa to a maximum half angle of view θmax is preferably equal to or greater than 0.15 and equal to or less than 0.35, more preferably equal to or greater than 0.16 and equal to or less than 0.25.

For example, since the maximum half angle of view θmax=900 in the above-described embodiment, the value of the half angle of view θa is preferably equal to or greater than 13.5° and equal to or less than 31.5°, more preferably equal to or greater than 14.4° and equal to or less than 22.5°.

Further, the optical system 201 is configured such that the projection characteristic y(θ) in the first region 201a is different from f×θ (equidistant projection method) and is also different from the projection characteristic in the second region 201b. f is a focal length of the optical system 201. In this case, it is desirable that the projection characteristic y(θ) of the optical system 201 satisfy the following conditional Expression (1).

$$1.0 < f \times \sin(\theta max)/y(\theta max) \leq 1.9 \quad (1)$$

By satisfying the Conditional Expression (1), it is possible to achieve a wide angle of view of the optical system 201 by reducing the resolution in the second region 201b. Further, in the first region 201a, a resolution can be made higher than in the central region of a general fisheye lens that adopts an orthographic projection method (y(θ)=f×sin θ).

When the value is less than a lower limit of the Conditional Expression (1), the resolution in the first region 201a becomes lower or a maximum image height becomes higher than that of a fisheye lens using an orthographic projection method, resulting in an increase in the size of the optical system, which leads to an undesirable result. On the other hand, when the value exceeds an upper limit of the Conditional Expression (1), the resolution in the first region 201a becomes excessively high, making it difficult to achieve a wide angle of view equivalent to that of a fisheye lens using an orthographic projection method, or making it difficult to maintain satisfactory optical performance, which leads to an undesirable result.

Further, it is preferable to satisfy the following Conditional Expression (2), and it is more preferable to satisfy the Conditional Expression (3).

$$1.0 < f \times \sin(\theta max)/y(\theta max) \leq 1.7 \quad (2)$$

$$1.0 < f \times \sin(\theta max)/y(\theta max) \leq 1.4 \quad (3)$$

As described above, in the first region 201a, a distortion of the optical system 201 is small and a resolution is high, and thus a high-definition image can be obtained compared to the second region 201b. Thus, the first region 201a (first angle of view 130) can be set to be an attention region of the user 140 to obtain good visibility.

For example, when the imaging device 1102 is disposed at the rear of the movable apparatus 100 as illustrated in FIG. 10A, an image corresponding to the first angle of view 130 is displayed on an electronic rearview mirror, and thus the user 140 can obtain a natural sense of perspective when gazing at a rear vehicle or the like. On the other hand, the second region 201b (second angle of view 131) corresponds to a wide angle of view including the first angle of view 130. Thus, for example, an image corresponding to the second angle of view 131 is displayed on an in-vehicle display when the movable apparatus 100 is running backward, and thus driving assistance of the user 140 can be performed.

Figure 11:
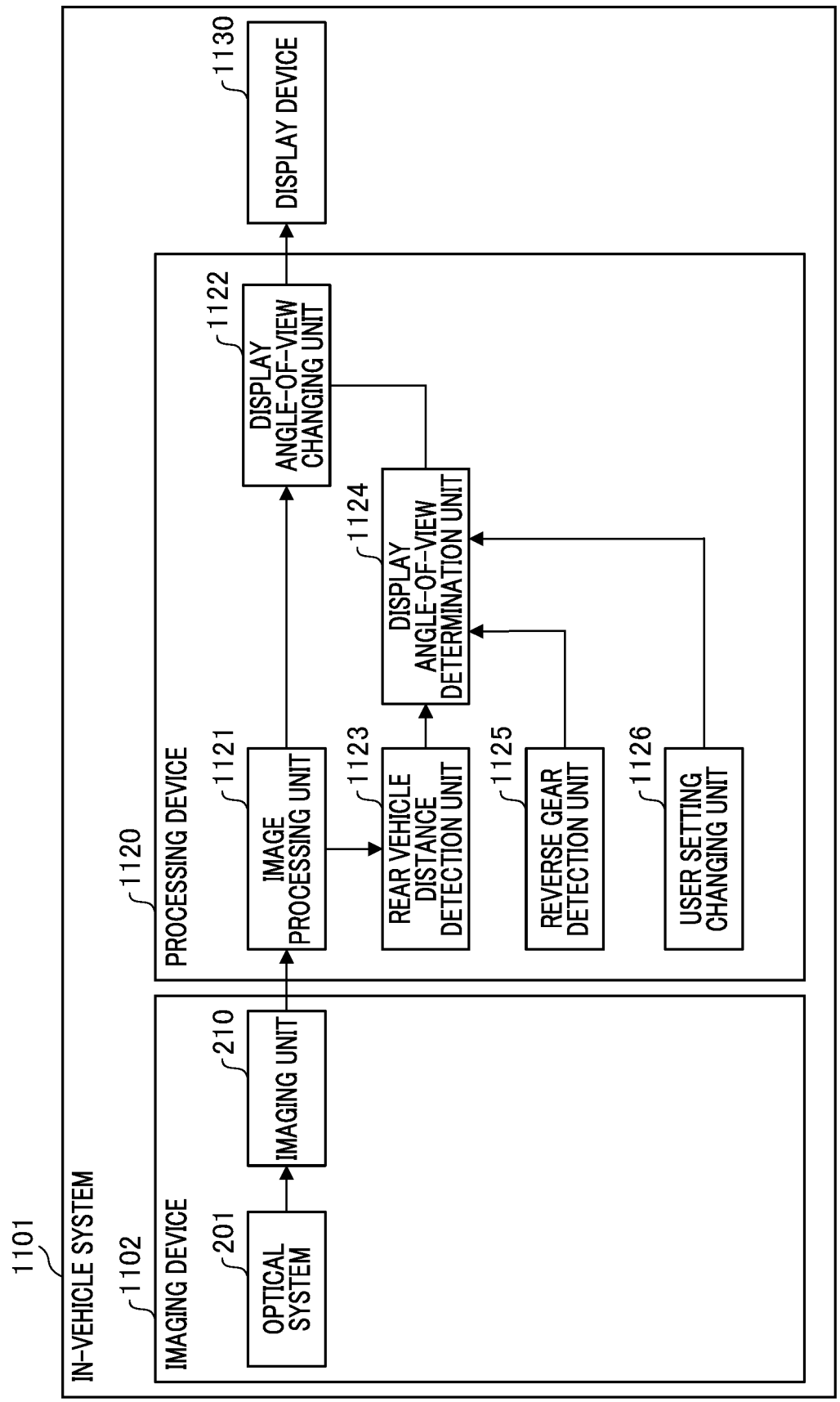
FIG. 11 is a functional block diagram illustrating a configuration example of an imaging system according to the sixth embodiment.

FIG. 11 is a functional block diagram illustrating a configuration example of an in-vehicle system according to the sixth embodiment. An in-vehicle system 1101 in the sixth embodiment exemplifies a system for displaying an image, which is obtained by an imaging device 1102 installed at the rear of the movable apparatus 100, for the user 140. The in-vehicle system 1101 includes an imaging device 1102, a processing device 1120, and a display device (display unit) 1130 that displays an image which is obtained based on an output of the imaging device. The imaging device 1102 includes the optical system 201 and the imaging unit 210 as described above.

The imaging unit 210 includes an imaging element such as a CCD sensor or a CMOS sensor, generates imaging data by photoelectrically converting an optical image formed by the optical system 201, and outputs the imaging data to the processing device 1120.

The processing device 1120 includes an image processing unit 1121, a display angle-of-view changing unit 1122, a rear vehicle distance detection unit 1123, a display angle-of-view determination unit 1124, a reverse gear detection unit 1125, a user setting changing unit 1126, and the like.

The processing device 1120 is a computer such as a central processing unit (CPU) microcomputer, and functions as a control unit that controls an operation of each component based on a computer program.

At least one component in the processing device 1120 may be realized by hardware such as an application specific integrated circuit (ASIC) or a programmable logic array (PLA).

The image processing unit 1121 performs image processing such as wide dynamic range (WDR) correction, gamma correction, look up table (LUT) processing, or distortion correction on the imaging data acquired from the imaging unit 210 to generate image data. The distortion correction is performed on at least imaging data corresponding to the second region 201b.

Thereby, when an image is displayed on the display device 1130, it becomes easier for the user 140 to visually recognize the image, and a detection rate of a rear vehicle in the rear vehicle distance detection unit 1123 is improved. Distortion correction may not be performed on imaging data corresponding to the first region 201a. The image processing unit 1121 outputs image data generated by executing the above-described image processing to the display angle-of-view changing unit 1122 and the rear vehicle distance detection unit 1123.

The rear vehicle distance detection unit 1123 acquires information on a distance to a rear vehicle included in image data corresponding to the range of the second angle of view 131 that does not include the first angle of view 130 by using the image data output from the image processing unit 1121.

For example, the rear vehicle distance detection unit 1123 can detect a rear vehicle based on the image data corresponding to the second region 201b in the image data and calculate a distance to a host vehicle from changes in the position and size of the detected rear vehicle, and the like. The rear vehicle distance detection unit 1123 outputs information on the calculated distance to the display angle-of-view determination unit 1124.

Further, the rear vehicle distance detection unit 1123 may determine a vehicle type of a rear vehicle based on data regarding feature information, such as the shape and color of each vehicle type, which is output as a result of machine learning (deep learning) based on images of a large number of vehicles.

In this case, the rear vehicle distance detection unit 1123 may output the information regarding the vehicle type of the rear vehicle to the display angle-of-view determination unit 1124. The reverse gear detection unit 1125 detects whether or not the transmission of the movable apparatus 100 (host vehicle) is in the reverse gear, and outputs the detection result to the display angle-of-view determination unit 1124.

Based on an output from at least one of the rear vehicle distance detection unit 1123 and the reverse gear detection unit 1125, the display angle-of-view determination unit 1124 determines to which one of the first angle of view 130 or the second angle of view 131 the angle of view (display angle of view) of an image displayed on the display device 1130 is set.

The display angle-of-view determination unit 1124 makes an output to the display angle-of-view changing unit 1122 in accordance with a determination result. For example, the display angle-of-view determination unit 1124 can determine that a display angle of view is set to be the second angle of view 131 when the value of a distance in distance information is equal to or less than a certain threshold value (for example, 3 m), and can determine that a display angle of view is set to be the first angle of view 130 when the value of the distance is greater than the threshold value.

Alternatively, the display angle-of-view determination unit 1124 determines to set the display angle of view to be the second angle of view 131 when the reverse gear detection unit 1125 gives a notification that the transmission of the movable apparatus 100 is in the reverse gear. In addition, the display angle-of-view determination unit 1124 determines that the display angle of view is set to be the first angle of view 130 when the transmission of the movable apparatus 100 is not in the reverse gear.

Further, the display angle-of-view determination unit 1124 can determine that the display angle of view is set to be the second angle of view 131 regardless of the result of the rear vehicle distance detection unit 1123 in a state where the transmission of the movable apparatus 100 is in the reverse gear. In addition, the display angle-of-view determination unit 1124 can determine that the display angle of view is determined in accordance with the detection result of the rear vehicle distance detection unit 1123 when the transmission of the movable apparatus 100 is not in the reverse gear.

The display angle-of-view determination unit 1124 may change a determination criterion for changing an angle of view in accordance with the vehicle type of the movable apparatus 100 by receiving vehicle type information from the rear vehicle distance detection unit 1123. For example, when the movable apparatus 100 is a large-sized vehicle such as a truck, a braking distance is longer than that of a normal vehicle, and thus it is desirable to set the above-described threshold value to be larger (for example, 10 m) than that of the normal vehicle.

The user setting changing unit 1126 is a unit for allowing the user 140 to change the criterion for determining whether to change the display angle of view to the second angle of view 131 by the display angle-of-view determination unit 1124. The determination criterion set (changed) by the user 140 is input from the user setting changing unit 1126 to the display angle-of-view determination unit 1124.

The display angle-of-view changing unit 1122 generates a display image to be displayed on the display device 1130 in accordance with the determination result of the display angle-of-view determination unit 1124. For example, when it is determined that the display angle of view is set to be the first angle of view 130, the display angle-of-view changing unit 1122 cuts out a rectangular narrow-angle image (first image) from the image data corresponding to the first angle of view 130 and outputs the cut-out image to the display device 1130.

In addition, when there is a rear vehicle that satisfies a predetermined condition in the image data corresponding to the second angle of view 131, the display angle-of-view changing unit 1122 outputs an image (second image) including the rear vehicle to the display device 1130.

The second image may include an image corresponding to the first region 201a. The display angle-of-view changing unit 1122 functions as a display control unit that performs display control for switching between a first display state in which the display device 1130 displays the first image and a second display state in which the display device 1130 displays the second image.

The cutting-out of the image which is performed by the display angle-of-view changing unit 1122 is executed by storing the image data output from the image processing unit 1121 in a storage unit (memory) such as a RAM and reading an image desired to be cut out from the image data.

A region corresponding to the first image in the image data is a rectangular region at the first angle of view 130 corresponding to the first region 201a. In addition, a region corresponding to the second image in the image data is a rectangular region including the rear vehicle at the second angle of view 131 corresponding to the second region 201b.

The display device 1130 includes a display unit such as a liquid crystal display or an organic EL, and displays a display image output from the display angle-of-view changing unit 1122. For example, the display device 1130 includes a first display unit as an electronic rearview mirror disposed on an upper side of the windshield (front glass) of the movable apparatus 100 and a second display unit as an operation panel (monitor) disposed on a lower side of the windshield of the movable apparatus 100. These display units may be head up displays (HUDs) that form a virtual image on the windshield (front glass).

According to the configuration described above, the first image and the second image generated from the image data described above can be displayed on the first display unit and the second display unit, respectively. That is, in the sixth embodiment, the first display unit can display the first image corresponding to the first angle of view, and the second display unit can display the second image corresponding to the second angle of view including the first angle of view.

The first display unit may be configured to be usable as a mirror when it is not used as a display, for example, by including a half mirror or the like. The second display unit may also serve as, for example, a display for a navigation system or an audio system. The movable apparatus 100 is not limited to a vehicle such as an automobile, and may be a mobile object such as a ship, an aircraft, an industrial robot, or a drone.

In addition, the in-vehicle system 1101 according to the sixth embodiment is used to display images for the user 140. However, the disclosure is not limited thereto, and the in-vehicle system 1101 may be used for cruise control (including a whole vehicle speed tracking function), automatic driving, and driving assistance for performing various warnings and displays for a driver.

Further, the in-vehicle system 1101 can be applied as an imaging system not only for movable apparatuses but also for various devices that use object recognition, such as intelligent transportation systems (ITS).

Further, in the in-vehicle system 1101 described above, the above-described distance measuring device may be adopted as the imaging device 1102. In this case, the in-vehicle system 1101 may include a determination unit that determines the possibility of collision with an object based on information on a distance to the object acquired by the imaging device 1102.

In addition, a stereo camera including two imaging units 210 may be adopted as the imaging device 1102. In this case, it is possible to simultaneously acquire image data by the imaging units synchronized with each other without using an imaging surface phase difference sensor and to perform the same processing as that described above by using the two pieces of image data.

However, when a difference in imaging time between the imaging units is known, it is not necessary to synchronize the imaging units with each other. Further, the imaging device 1102 described above may have a configuration in which a resolution at the second angle of view (second region) is higher than a resolution at the first angle of view (first region), if necessary.

That is, the number of pixels per unit angle of view in the first region may be smaller than the number of pixels per unit angle of view in the second region excluding the first region. Such a configuration is suitable when it is desirable to enlarge and image a subject in a peripheral portion rather than in the center of an angle of view, such as when the imaging device 1102 is provided at the position of a side mirror of a vehicle.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging device and the like through a network or various storage media. Then, a computer (or a CPU, an MPU, or the like) of the imaging device and the like may be configured to read and execute the program. In such a case, the program and the storage medium storing the program configure the present disclosure.

In addition, this disclosure includes, for example, those realized using at least one processor or circuit configured to function of the embodiments explained above. Note that distributed processing may be performed using a plurality of processors.

This application claims the benefit of Japanese patent application No. 2022-175527, filed on Nov. 1, 2022, which is hereby incorporated by reference herein in its entirety.

What is claimed is:

1. A lens device comprising:
a lens barrel configured to accommodate a plurality of lenses;
a retaining member configured to be in contact with at least one of the plurality of lenses;
a biased portion fixed to the retaining member; and
an elastic member disposed between the biased portion and the lens barrel in an optical axis direction,
wherein the biased portion is disposed on an inner side of the retaining member and on an outer side of the lens barrel in a radial direction, and
wherein the biased portion is biased by the lens barrel via the elastic member in the optical axis direction.

2. The lens device according to claim 1, wherein a part of the biased portion on an object side is in contact with the lens barrel in the optical axis direction.

3. The lens device according to claim 1, wherein the biased portion is separate from the retaining member, and
wherein a position of an inner diameter of the elastic member is based on an outer diameter of the lens barrel, and the position of the elastic member is guided in the radial direction.

4. The lens device according to claim 1, wherein a male screw portion is provided on an outer surface of the biased portion, a female screw portion is provided on an inner surface of the retaining member, and the retaining member and the biased portion are fixed by screwing the male screw portion and the female screw portion together,
wherein the female screw portion is provided on an inner diameter portion of the retaining member, and
wherein the male screw portion is provided on an outer diameter portion of the biased portion.

5. The lens device according to claim 4, wherein the biased portion has a concave portion or a convex portion having an optical axis direction component in a depth direction on an image plane side of the lens barrel, and the retaining member has a concave portion or a convex portion having an optical axis direction component in a depth direction on an object side.

6. The lens device according to claim 1, wherein the elastic member is made of a metal material.

7. The lens device according to claim 1, wherein the lens barrel is made of a metal material.

8. An optical device comprising:
the lens device according to claim 1; and
a housing configured to hold the lens device,
wherein a portion of the lens device is exposed from the housing.

9. An imaging device comprising:
the lens device according to claim 1; and
an imaging element configured to image an object through the lens device.

10. An imaging system comprising:
an imaging device having the lens device according to claim 1, and an imaging element configured to image an object through the lens device;
a display device configured to display an image obtained based on an output of the imaging device.

11. The imaging system according to claim 10, wherein the display device includes a first display unit configured to display a first part corresponding to a first angle of view in the image, and a second display unit configured to display a second part corresponding to a second angle of view including the first angle of view.

12. A movable apparatus comprising:
an imaging device having the lens device according to claim 1, and an imaging element configured to image an object through the lens device; and
a driving unit,
wherein the driving unit is configured to move the movable apparatus.

* * * * *